US012490196B2

(12) United States Patent
Sridharan et al.

(10) Patent No.: US 12,490,196 B2
(45) Date of Patent: Dec. 2, 2025

(54) ANTENNA GROUPING FOR POWER MANAGEMENT IN WIRELESS COMMUNICATIONS

(71) Applicant: QUALCOMM Incorporated, San Diego, CA (US)

(72) Inventors: Gokul Sridharan, Sunnyvale, CA (US); Kazuki Takeda, Tokyo (JP); Tienyow Liu, Santa Clara, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 685 days.

(21) Appl. No.: 17/887,033

(22) Filed: Aug. 12, 2022

(65) Prior Publication Data
US 2024/0056978 A1  Feb. 15, 2024

(51) Int. Cl.
*H04W 52/02* (2009.01)
(52) U.S. Cl.
CPC ............... *H04W 52/0274* (2013.01)
(58) Field of Classification Search
CPC ......... H04W 52/0261; H04W 52/0245; H04W 52/0274; H04W 52/30; H04W 52/04; H04W 52/18; H04W 52/0209
See application file for complete search history.

(56) References Cited

U.S. PATENT DOCUMENTS

| | | | |
|---|---|---|---|
| 2009/0232079 A1* | 9/2009 | Khandekar | H04L 5/14 370/329 |
| 2013/0045697 A1* | 2/2013 | Cheng | H01Q 1/2275 455/95 |
| 2017/0064641 A1* | 3/2017 | Logan | H04W 52/367 |
| 2019/0081753 A1* | 3/2019 | Jung | H04L 1/1854 |
| 2020/0367083 A1* | 11/2020 | Hao | H04B 7/0695 |
| 2020/0396685 A1* | 12/2020 | Nam | H04B 7/063 |

FOREIGN PATENT DOCUMENTS

CN            107483075 A   * 12/2017

* cited by examiner

*Primary Examiner* — Dinh Nguyen
(74) *Attorney, Agent, or Firm* — Holland & Hart LLP

(57) ABSTRACT

Methods, systems, and devices for wireless communications are described. In some systems, a user equipment (UE) may transmit uplink transmission using antenna elements mapped to one or more antenna ports. The UE may transmit a first message to a network entity to indicate antenna ports that are available for wireless communications at the UE. The UE may transmit a second message to the network entity to indicate antenna groups associated with the antenna ports. Each antenna group may include a respective set of one or more antenna elements and may be associated with a respective transmit power threshold. The network entity may select a first antenna group of the one or more antenna groups for the UE to use for uplink transmissions. The UE may transmit, after transmitting the first and second messages, one or more uplink transmissions to the network entity using the first antenna group.

28 Claims, 17 Drawing Sheets

ANTENNA GROUPING FOR POWER MANAGEMENT IN WIRELESS COMMUNICATIONS

FIELD OF TECHNOLOGY

The following relates to wireless communications, including antenna grouping for power management in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

To reduce radiation exposure to a user, some wireless devices may comply with various constraints set by regulatory agencies. For example, a UE may be configured with radio frequency (RF) exposure limitations or thresholds to reduce possible exposure. The RF exposure thresholds may include a maximum transmission power, a specific absorption rate (SAR), a maximum permissible exposure (MPE), or any combination thereof.

SUMMARY

The described techniques relate to improved methods, systems, devices, and apparatuses that support antenna grouping for power management in wireless communications. For example, a user equipment (UE) may use different antenna groups at different times and thereby increase overall transmission power for communications without violating one or more transmission power limits (e.g., while avoiding excessive radio frequency (RF) exposure for a user of the UE). For example, different antenna groups may be in different physical locations at the UE, such that greater overall uplink transmit power (e.g., across some duration of time) may be achieved by switching which antenna group is used at different times.

Antenna elements at the UE may be organized as one or more antenna groups (e.g., based on a physical location of the antenna elements at the UE, or some other grouping basis). Each antenna group may be associated with a respective transmit power threshold. The UE may transmit a message to the network entity to indicate the one or more antenna groups, and in some cases the UE may also indicate a mapping or association between the antenna groups and the antenna ports at the UE. In some examples, to indicate the antenna groups, the UE may include one or more transmit precoding matrix indicators (TPMIs) associated with the antenna group in the message. In some examples, the UE may also perform power headroom reporting or other types of reporting on a per-group basis for the antenna groups. For instance, the UE may transmit one or more transmission power reports to indicate a respective power headroom (PHR), a respective power density threshold, or both for each antenna group. The network entity may indicate one or more of the antenna groups for the UE to use for subsequent uplink transmissions. By associating groups of antenna elements with different transmit power thresholds, the UE may support increased overall transmission power while satisfying one or more related transmit power limits (e.g., without violating one or more RF exposure limits).

A method for wireless communications at a user equipment (UE) is described. The method may include transmitting a first message that indicates a set of multiple antenna ports available for the wireless communications at the UE, transmitting a second message that indicates a set of multiple antenna groups associated with the set of multiple antenna ports, where the set of multiple antenna groups include respective sets of one or more antenna elements and are associated with respective transmit power thresholds, and transmitting, after transmitting the first message and the second message, one or more uplink transmissions using a first antenna group of the set of multiple antenna groups.

An apparatus for wireless communications at a UE is described. The apparatus may include a processor, memory coupled with the processor, and instructions stored in the memory. The instructions may be executable by the processor to cause the apparatus to transmit a first message that indicates a set of multiple antenna ports available for the wireless communications at the UE, transmit a second message that indicates a set of multiple antenna groups associated with the set of multiple antenna ports, where the set of multiple antenna groups include respective sets of one or more antenna elements and are associated with respective transmit power thresholds, and transmit, after transmitting the first message and the second message, one or more uplink transmissions using a first antenna group of the set of multiple antenna groups.

Another apparatus for wireless communications at a UE is described. The apparatus may include means for transmitting a first message that indicates a set of multiple antenna ports available for the wireless communications at the UE, means for transmitting a second message that indicates a set of multiple antenna groups associated with the set of multiple antenna ports, where the set of multiple antenna groups include respective sets of one or more antenna elements and are associated with respective transmit power thresholds, and means for transmitting, after transmitting the first message and the second message, one or more uplink transmissions using a first antenna group of the set of multiple antenna groups.

A non-transitory computer-readable medium storing code for wireless communications at a UE is described. The code may include instructions executable by a processor to transmit a first message that indicates a set of multiple antenna ports available for the wireless communications at the UE, transmit a second message that indicates a set of multiple antenna groups associated with the set of multiple antenna ports, where the set of multiple antenna groups include respective sets of one or more antenna elements and are associated with respective transmit power thresholds, and transmit, after transmitting the first message and the second message, one or more uplink transmissions using a first antenna group of the set of multiple antenna groups.

Some examples of the method, apparatuses, and non-transitory computer-readable medium described herein may further include operations, features, means, or instructions for receiving, based on the first message and the second message, a control message that indicates the first antenna group of the set of multiple antenna groups, where transmitting the one or more uplink transmissions using the first antenna group may be based on the control message.

Some examples of the method, apparatuses, and non-transitory computer-readable medium described herein may further include operations, features, means, or instructions for transmitting one or more transmission power reports that each include transmit power information for a respective antenna group of the set of multiple antenna groups.

In some examples of the method, apparatuses, and non-transitory computer-readable medium described herein, the transmit power information in each transmission power report indicates a PHR for the respective antenna group.

In some examples of the method, apparatuses, and non-transitory computer-readable medium described herein, the transmit power information in each transmission power report indicates a power density threshold for the respective antenna group, the power density threshold associated with a specific absorption rate, a maximum permissible exposure, or both.

Some examples of the method, apparatuses, and non-transitory computer-readable medium described herein may further include operations, features, means, or instructions for receiving a control message that indicates a first TPMI associated with the first antenna group and transmitting a first uplink transmission using the first antenna group based on the control message, where the one or more transmission power reports include at least a first transmission power report including first transmit power information for the first antenna group based on the first uplink transmission using the first antenna group being a most recent uplink transmission by the UE.

In some examples of the method, apparatuses, and non-transitory computer-readable medium described herein, the transmit power information in each transmission power report corresponds to a difference between a transmit power associated with uplink transmissions using the respective antenna group and the respective transmit power threshold for the respective antenna group.

In some examples of the method, apparatuses, and non-transitory computer-readable medium described herein, the transmit power information in each transmission power report corresponds to a maximum time period associated with transmitting the one or more uplink transmissions at a first transmit power.

Some examples of the method, apparatuses, and non-transitory computer-readable medium described herein may further include operations, features, means, or instructions for transmitting, for each antenna group of the set of multiple antenna groups indicated via the second message, a set of one or more TPMIs associated with the antenna group, where the set of one or more TPMIs maps the antenna group to a respective set of one or more antenna ports of the set of multiple antenna ports at the UE.

Some examples of the method, apparatuses, and non-transitory computer-readable medium described herein may further include operations, features, means, or instructions for receiving a control message that indicates a first TPMI associated with the first antenna group based on transmitting the set of one or more TPMIs for each antenna group, where transmitting the one or more uplink transmissions using the first antenna group may be based on the control message indicating the first TPMI.

Some examples of the method, apparatuses, and non-transitory computer-readable medium described herein may further include operations, features, means, or instructions for transmitting signaling that indicates one or more metrics associated with a channel at a first antenna port of the UE that maps to the first antenna group and receiving, based on the one or more metrics associated with the channel at the first antenna port and the respective transmit power threshold for the first antenna group, a control message that indicates a first TPMI associated with the first antenna group, where transmitting the one or more uplink transmissions using the first antenna group may be based on the control message indicating the first TPMI.

In some examples of the method, apparatuses, and non-transitory computer-readable medium described herein, the first TPMI may be associated with the first antenna group and one or more other antenna groups of the set of multiple antenna groups and the method, apparatuses, and non-transitory computer-readable medium may include further operations, features, means, or instructions for selecting the first antenna group based on the first TPMI and a first power density threshold associated with the first antenna group being less than power density thresholds associated with each of the one or more other antenna groups.

In some examples of the method, apparatuses, and non-transitory computer-readable medium described herein, the respective transmit power threshold for each antenna group may be based on a sum of a normalized specific absorption rate exposure and a normalized power density exposure for the antenna group.

In some examples of the method, apparatuses, and non-transitory computer-readable medium described herein, the set of multiple antenna groups may be associated with respective physical locations at the UE.

A method for wireless communications at a network entity is described. The method may include receiving a first message that indicates a set of multiple antenna ports at a UE that are available for the wireless communications, receiving a second message that indicates a set of multiple antenna groups associated with the set of multiple antenna ports, where the set of multiple antenna groups include respective sets of one or more antenna elements and are associated with respective transmit power thresholds, and receiving, after receiving the first message and the second message, one or more uplink transmissions from a first antenna group of the set of multiple antenna groups.

An apparatus for wireless communications at a network entity is described. The apparatus may include a processor, memory coupled with the processor, and instructions stored in the memory. The instructions may be executable by the processor to cause the apparatus to receive a first message that indicates a set of multiple antenna ports at a UE that are available for the wireless communications, receive a second message that indicates a set of multiple antenna groups associated with the set of multiple antenna ports, where the set of multiple antenna groups include respective sets of one or more antenna elements and are associated with respective transmit power thresholds, and receive, after receiving the first message and the second message, one or more uplink transmissions from a first antenna group of the set of multiple antenna groups.

Another apparatus for wireless communications at a network entity is described. The apparatus may include means for receiving a first message that indicates a set of multiple antenna ports at a UE that are available for the wireless communications, means for receiving a second message that indicates a set of multiple antenna groups associated with the set of multiple antenna ports, where the set of multiple antenna groups include respective sets of one or more antenna elements and are associated with respective transmit power thresholds, and means for receiving, after receiving the first message and the second message, one or more uplink transmissions from a first antenna group of the set of multiple antenna groups.

A non-transitory computer-readable medium storing code for wireless communications at a network entity is described. The code may include instructions executable by a processor to receive a first message that indicates a set of multiple antenna ports at a UE that are available for the wireless communications, receive a second message that indicates a set of multiple antenna groups associated with the set of multiple antenna ports, where the set of multiple antenna groups include respective sets of one or more antenna elements and are associated with respective transmit power thresholds, and receive, after receiving the first message and the second message, one or more uplink transmissions from a first antenna group of the set of multiple antenna groups.

Some examples of the method, apparatuses, and non-transitory computer-readable medium described herein may further include operations, features, means, or instructions for selecting, based on the first message and the second message, the first antenna group of the set of multiple antenna groups for the UE to use for the one or more uplink transmissions and transmitting a control message that indicates the first antenna group, where receiving the one or more uplink transmissions from the first antenna group may be based on the control message indicating the first antenna group.

Some examples of the method, apparatuses, and non-transitory computer-readable medium described herein may further include operations, features, means, or instructions for receiving one or more transmission power reports each including transmit power information for a respective antenna group of the set of multiple antenna groups.

In some examples of the method, apparatuses, and non-transitory computer-readable medium described herein, the transmit power information in each transmission power report indicates a PHR for the respective antenna group.

In some examples of the method, apparatuses, and non-transitory computer-readable medium described herein, the transmit power information in each transmission power report indicates a power density threshold for the respective antenna group, the power density threshold associated with a specific absorption rate, a maximum permissible exposure, or both.

Some examples of the method, apparatuses, and non-transitory computer-readable medium described herein may further include operations, features, means, or instructions for transmitting a control message that indicates a first TPMI associated with the first antenna group and receiving a first uplink transmission from the first antenna group based on the control message indicating the first TPMI, where the one or more transmission power reports include at least a first transmission power report including first transmit power information for the first antenna group based on the first uplink transmission using the first antenna group being a most recent uplink transmission by the UE.

In some examples of the method, apparatuses, and non-transitory computer-readable medium described herein, the transmit power information in each transmission power report corresponds to a difference between a transmit power associated with uplink transmissions using the respective antenna group and the respective transmit power threshold for the respective antenna group.

In some examples of the method, apparatuses, and non-transitory computer-readable medium described herein, the transmit power information in each transmission power report corresponds to a maximum time period associated with transmission of the one or more uplink transmissions at a first transmit power.

Some examples of the method, apparatuses, and non-transitory computer-readable medium described herein may further include operations, features, means, or instructions for receiving, for each antenna group of the set of multiple antenna groups indicated via the second message, a set of one or more TPMIs associated with the antenna group, where the set of one or more TPMIs maps the antenna group to a respective set of one or more antenna ports of the set of multiple antenna ports at the UE.

Some examples of the method, apparatuses, and non-transitory computer-readable medium described herein may further include operations, features, means, or instructions for transmitting a control message that indicates a first TPMI associated with the first antenna group based on receiving the set of one or more TPMIs for each antenna group, where receiving the one or more uplink transmissions from the first antenna group may be based on the control message indicating the first TPMI.

Some examples of the method, apparatuses, and non-transitory computer-readable medium described herein may further include operations, features, means, or instructions for selecting, from a set of multiple TPMIs, a first TPMI associated with the first antenna group based on an indication of one or more metrics associated with a channel at a first antenna port of the UE that maps to the first antenna group and the respective transmit power threshold for the first antenna group and transmitting, based on the selecting, a control message that indicates a first TPMI associated with the first antenna group, where receiving the one or more uplink transmissions from the first antenna group may be based on the control message indicating the first TPMI.

In some examples of the method, apparatuses, and non-transitory computer-readable medium described herein, the respective transmit power threshold for each antenna group may be based on a sum of a normalized specific absorption rate exposure and a normalized power density exposure for the antenna group.

In some examples of the method, apparatuses, and non-transitory computer-readable medium described herein, the set of multiple antenna groups may be associated with respective physical locations on the UE.

DETAILED DESCRIPTION

Figure 1:
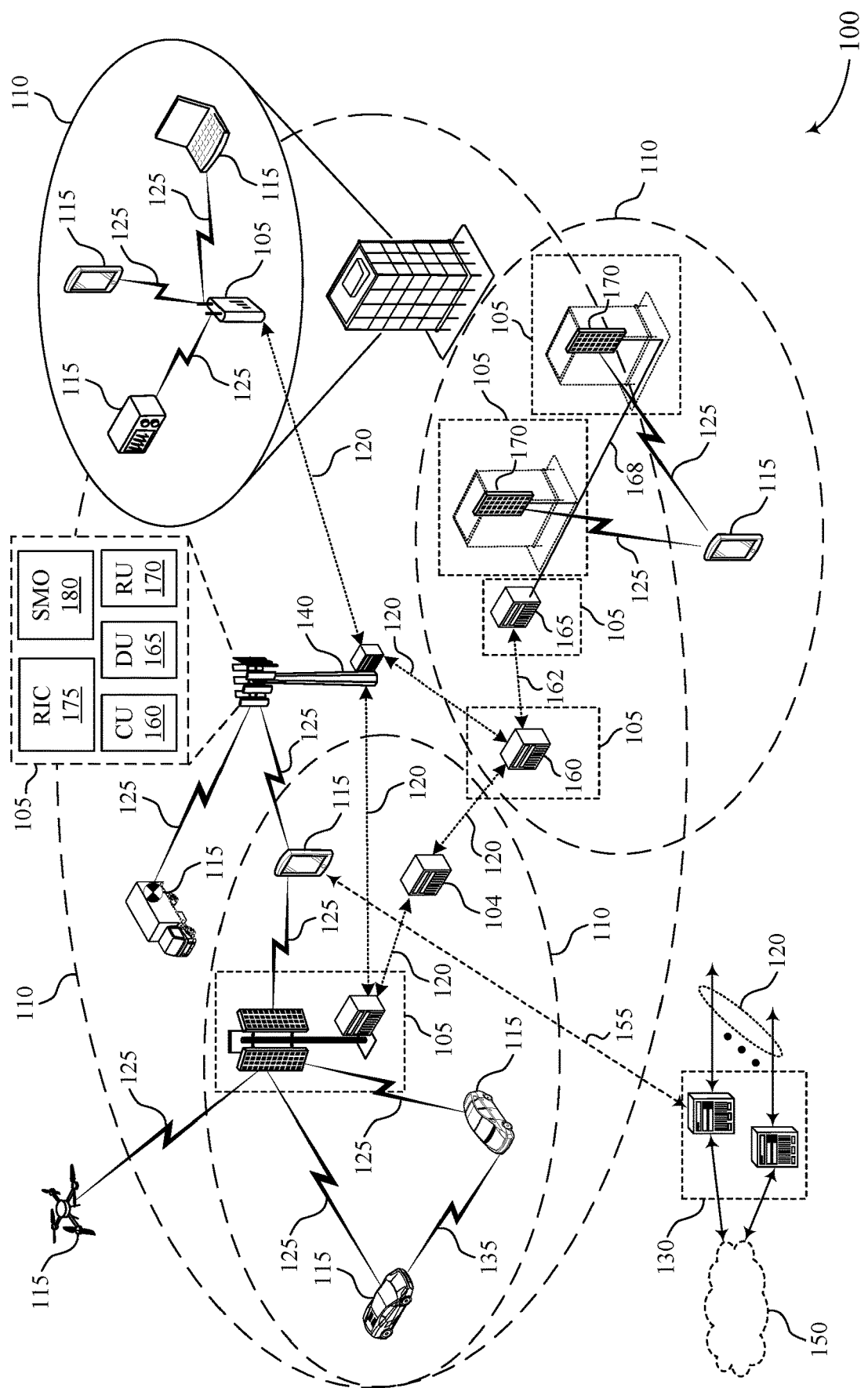
FIG. 1 illustrates an example of a wireless communications system that supports antenna grouping for power management in wireless communications in accordance with one or more aspects of the present disclosure.

In some wireless communication systems, devices may be configured with one or more transmission power limits (e.g., to avoid excessive exposure of a user to electromagnetic energy). For example, a UE may be configured with a maximum transmission power (e.g., a maximum power density), a specific absorption rate (SAR) limit, a maximum permissible exposure (MPE) limit, or any combination thereof to avoid excessive exposure. SAR may correspond to a measurement of power absorbed by a certain volume of human tissue. MPE may correspond to a power density measurement (e.g., watts per square centimeter) and may relate to the heating of human tissue. In some cases, a UE may not be able to transmit at a full transmit power using a single antenna port or antenna element of the UE due to a transmission power limit, which in some cases may alternatively be referred to as a transmission power threshold.

Techniques, systems, and devices described herein support the application of transmission power limits on a per-antenna group basis. This may, for example, allow for increased transmission power while satisfying such limits (e.g., without violating applicable SAR or MPE limits). For example, different antenna groups may be in different physical locations at the UE, such that greater overall uplink transmit power may be achieved by switching which antenna group is used at different times—e.g., an antenna group located within a first physical region (e.g., the top of the UE) may be used during a first time period, and once a relevant power threshold is reached for that first physical region, the UE may switch to using a different antenna group located within a second physical region (e.g., at the bottom of phone) until the relevant power threshold is reached for that second physical region, and so on.

In some examples, a UE may transmit a message that indicates multiple groups of antenna elements each mapped to or associated with an antenna port of the UE. The groups of antenna elements may be referred to as antenna groups, antenna modules, or both herein. Each antenna group of the UE may be associated with one or more respective transmission power thresholds. In some examples, the UE may also perform power headroom reporting or other types of reporting on a per-group basis for the antenna groups. For example, the UE may report transmission PHR, power density information (e.g., SAR or MPE information), or both to a network entity for each antenna group. In some examples, the UE may indicate one or more transmit precoding matrix indicators (TPMIs) via the transmission power report. The TPMIs may map each antenna group to a respective set of one or more antenna ports of the UE.

The network entity, the UE, or both may select an antenna group to use for subsequent uplink transmissions based on one or more channel metrics (e.g., a reference signal received power (RSRP)), a power density budget of an antenna group, or both. The network entity may transmit a control message to the UE to indicate the selected antenna group. The antenna group selection may change dynamically over time, such that the UE may switch between antenna groups for uplink communications. For example, if the UE transmits using a first antenna group for a first time period, and the transmission power budget for the first antenna group is satisfied, the network entity may indicate that the UE is to switch to transmitting using a second antenna group associated with a second transmit power budget. The described antenna grouping techniques may thereby provide for increased overall uplink transmission power from the UE while satisfying RF exposure thresholds for the UE, which may increase reliability and throughput of uplink communications.

Aspects of the disclosure are initially described in the context of wireless communications systems. Additional aspects of the disclosure are described with reference to an antenna element grouping configuration and a process flow. Aspects of the disclosure are further illustrated by and described with reference to apparatus diagrams, system diagrams, and flowcharts that relate to antenna grouping for power management in wireless communications.

FIG. 1 illustrates an example of a wireless communications system 100 that supports antenna grouping for power management in wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child TAB node 104 to receive signaling from a parent TAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through TAB nodes 104, or may directly signal transmissions to a UE 115, or both. The CU 160 of IAB donor may signal communication link establishment via an F1 interface to IAB nodes 104, and the TAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with TAB node 104 may be scheduled by DU 165 of IAB node 104.

In the case of the techniques described herein applied in the context of a disaggregated RAN architecture, one or more components of the disaggregated RAN architecture may be configured to support antenna grouping for power management in wireless communications as described herein. For example, some operations described as being performed by a UE 115 or a network entity 105 (e.g., a base station 140) may additionally, or alternatively, be performed by one or more components of the disaggregated RAN architecture (e.g., TAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communications systems, uplink dynamic power aggregation (e.g., uplink carrier aggregation) may provide for one or more UEs 115 to harvest transmit power potential from multiple bands. For example, each band supported by the UE 115 during uplink carrier aggregation may represent transmit power potential, and uplink dynamic power aggregation may provide for the UE 115 to harvest the transmit power potential from multiple bands (e.g., a low band, a high band, or the like). In some cases, dynamic power aggregation techniques may provide for the UE 115 to transmit using a total available power (e.g., peak power) for a relatively short duration and reduce power during a remaining duration of a relatively long term duty cycle (e.g., a duty cycle having a 30 second period, or some other duration). Such techniques may provide for the UE 115 to maintain SAR compliance while increasing a perceived uplink throughput.

In some examples, a device that supports uplink dynamic power aggregation may be configured with one or more power limits within which the device may maintain power levels. For example, a UE 115 may identify or determine an average power at a time, t, (e.g., $P_{ave}(t)$) by averaging an instantaneous transmit power (e.g., $P_{inst}(t')$) within a window (e.g., t−W−D<t'≤t−D, where W may be a size of the window and D may be a zero or nonzero gap from an end of the window to the time, t). The UE 115 may set the instantaneous transmit power at time t (e.g., $P_{inst}(t)$) so that $P_{ave}(t)$ ≤$P_{ave,max}$, where $P_{ave,max}$ is an average power limit for the UE 115. The UE 115 may set the instantaneous transmit power so that $P_{inst}(t)$ may be scaled down from a requested transmit power, $P_{req}(t)$, at time t. Accordingly, the UE 115 may optimize transmit power while remaining below (e.g., satisfying) the configured transmit power limits for uplink dynamic power aggregation. In some examples, the wireless communications system 100 may support uplink multiple input MIMO communications. To support uplink MIMO, one or more UEs 115 may include or be equipped with multiple full-power capable power amplifiers, which may be used at least partially simultaneously to provide additional uplink power.

As described herein, wireless devices in the wireless communications system 100 may utilize antenna grouping techniques associated with one or more power amplifiers to increase uplink transmit power while satisfying RF exposure regulations. In some examples, a UE 115 may notify a network entity 105 about multiple antenna ports available for wireless communications (e.g., the UE 115 may support uplink MIMO communications). The UE 115 may indicate multiple groups of antenna elements at the UE 115 and transmit power thresholds associated with the antenna groups. In some examples, the UE 115 may indicate a TPMI that maps each antenna group to a respective antenna port of the UE 115. The UE 115 may transmit a transmission power report for each antenna group to the network entity 105. The transmission power report for each antenna group may indicate a PHR and power density, which may include a SAR threshold, an MPE threshold, or both.

Figure 2:
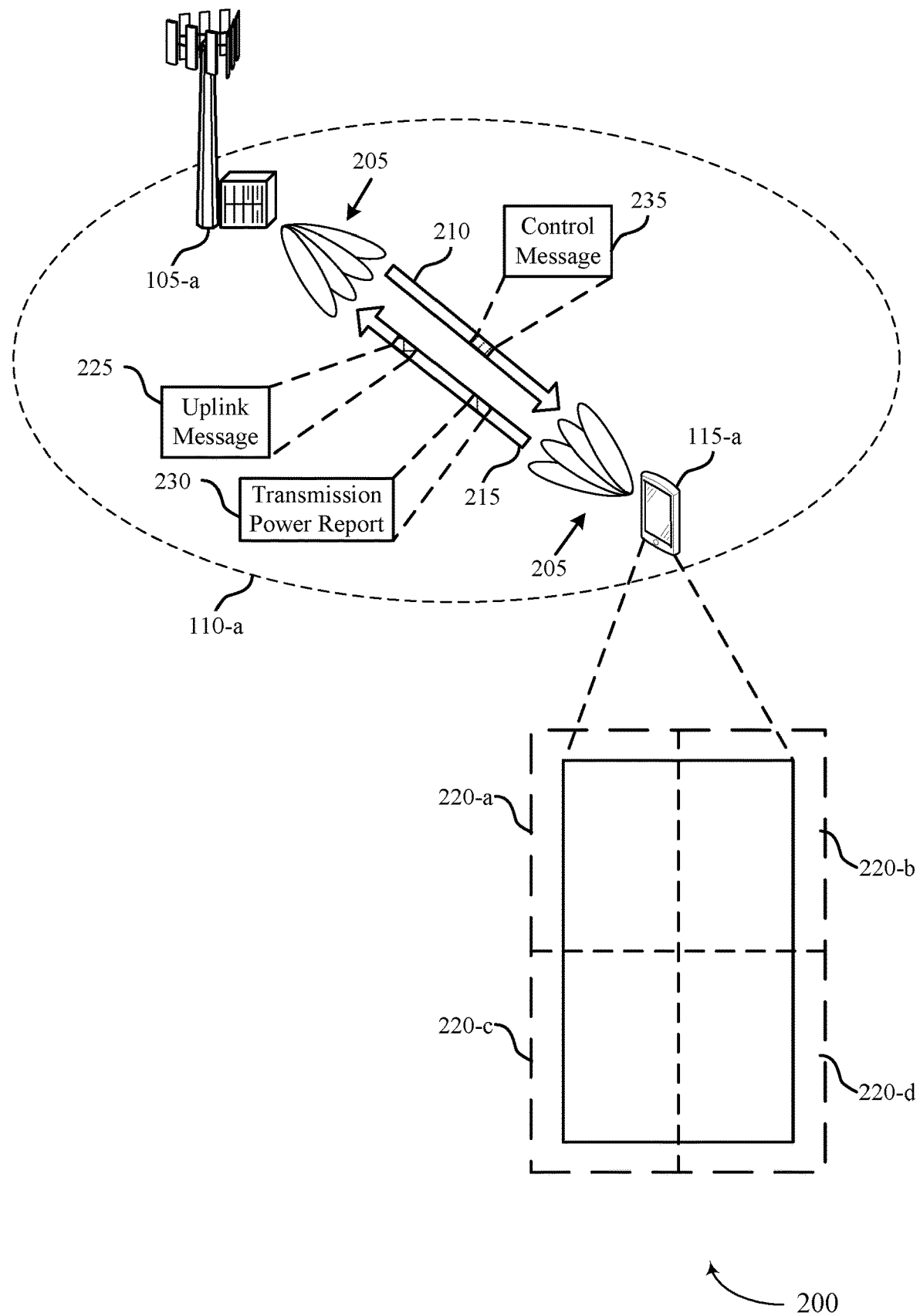
FIG. 2 illustrates an example of a wireless communications system that supports antenna grouping for power management in wireless communications in accordance with one or more aspects of the present disclosure.

FIG. 2 illustrates an example of a wireless communications system 200 that supports antenna grouping for power management in wireless communications in accordance with one or more aspects of the present disclosure. The wireless communications system 200 may implement or be implemented by aspects of the wireless communications system 100. For example, the wireless communications system 200 illustrates a UE 115-a and a network entity 105-a, which may represent examples of corresponding devices as described with reference to FIG. 1. The network entity 105-a and the UE 115-a may communicate within the geographic coverage area 110-a and via an uplink communication link 215 and a downlink communication link 210. In some examples, the UE 115-a may group one or more antenna elements to improve transmission power application and reporting.

The network entity 105-a and the UE 115-a may support beamformed communications. For example, each of the network entity 105-a and the UE 115-a may support a respective set of one or more beams 205 for wireless communications. The UE 115-a may be equipped with multiple antenna elements. Each antenna element may be associated with or mapped to a respective power amplifier and one or more respective antenna ports (e.g., uplink MIMO communications). Each antenna element may operate in or be associated with one or more respective frequency bands (e.g., for carrier aggregation). In some examples, the power amplifiers at the UE 115-a may provide additional (e.g., amplified) uplink power for transmissions via a given frequency band.

The wireless communications system 200 may configure or support one or more RF exposure regulations, such as RF exposure parameters, limits, or thresholds. Wireless devices in the wireless communications system 200 may dynamically adjust transmit power levels to comply with the RF exposure regulations. In some examples, the RF exposure limits may be different based on frequency spectrums or bands used for wireless communications. For example, for some frequency spectrums (e.g., a sub-six GHz spectrum), SAR may be used as a metric for RF exposure. For other frequency bands (e.g., mmW wave bands), MPE may be used as a metric for RF exposure. SAR may be used to measure power absorbed by a certain volume of human tissue. The units of SAR may be watts per kilogram or watts per cubic centimeter to measure power absorbed by a certain area or volume of human tissue. MPE compliance regulations may address exposure concerns at relatively high frequency bands. MPE may measure power density in units of watts per square centimeter.

In some examples, MPE compliance may be relatively complex. For example, to determine or calculate MPE, the UE 115-a, or some other wireless device, may determine a proximity of human tissue to the UE 115-a. As such, the UE 115-a may, in some examples, be equipped with a framework of sensors and algorithms that may be operable to determine proximity of human tissue. A detection result index (DRI) may report the distance of human tissue as a quantized value. For example, a DRI of zero may indicate human tissue on the surface of the UE 115-a (e.g., a hand holding the device). Each quantized DRI value may be associated with a respective effective isotropic radiated power (EIRP) limit or threshold. For example, if the DRI is zero, the EIRP may, in some examples, be less than or equal to eight decibels per milliwatt (dBm) (e.g., or some other threshold value). As the DRI increases, the EIRP threshold may also increase. For example, if the distance between the UE 115-a and human tissue increases to 10-140 millimeter (mm), the EIRP threshold may increase up to 34 dBm, or some other threshold. As such, the DRI may determine how much power density exposure is acceptable. The EIRP threshold may be calculated according to Equation 1.

$$EIRP = PD * 4 * \pi * R^2 \quad (1)$$

In the example of Equation 1, the parameter PD may represent a power density limit, which may be provided in units of watts per square centimeter based on the MPE threshold. R may represent a radius of an area of power radiated from the UE 115-a.

In some examples, SAR and MPE or power density compliance may depend on one another. For example, an RF exposure from the UE 115-a may be calculated as a sum of a normalized SAR exposure and a normalized power density exposure. An RF exposure threshold per antenna group may be calculated or set according to SAR and power density based on Equation 2.

$$\sum_{i=100 kHz}^{10 GHz} \frac{SAR_i}{SAR_{lim}} + \sum_{10 GHz}^{300 GHz} \frac{PD_i}{PD_{lim}} \leq 1 \quad (2)$$

The $SAR_i$ parameter may represent an instantaneous SAR measurement and the $SAR_{lim}$ parameter may represent a maximum limit of SAR measurement. The $PD_i$ parameter may represent an instantaneous power density measurement and the $PD_{lim}$ parameter may represent a maximum limit of power density measurement. In some examples, RF exposure regulations may affect transmit power levels used by the UE 115-a for uplink communications. For example, the UE 115-a may not be able to transmit an uplink transmission at full power (e.g., the UE 115-a may not utilize a full potential of the power amplifiers at the UE 115-a) without exceeding the normalized RF exposure threshold, the SAR threshold, the MPE threshold, or any combination thereof.

As described herein, wireless devices in the wireless communications system 200 may utilize antenna grouping to increase an overall transmission power while satisfying RF exposure regulations. RF exposure incurred by a user of a wireless device may be measured by an average radiated power within an area (e.g., on a per-square centimeter basis). Thus, the RF exposure regulations or thresholds may be applied for a given physical region or area, such that a wireless device may radiate power at up to a given power threshold within a given area to satisfy the RF exposure regulations. Accordingly, techniques, systems, and devices described herein provide for a wireless device to apply transmit power limits on a per-antenna group basis, which may improve overall transmission power and throughput while satisfying RF exposure regulations.

The UE 115-a (e.g., a cell phone, a tablet, or some other wireless device) may be equipped with multiple antenna elements distributed across different parts of the UE 115-a (e.g., front panels, back panels, top corners, edges, or the like). The antenna elements may, in some examples, be disposed in one or more antenna modules or panels on the UE 115-a. To group antenna elements as described herein, the UE 115-a may determine one or more different physical areas 220 or regions of the UE 115-a (e.g., SAR regions) over which a respective SAR or MPE threshold may be applied. Each of the areas 220 may be different from one another (e.g., partially overlapping or non-overlapping), such that each of the areas 220 may have a specified SAR budget and other power safety exposure limits independent from any of the other areas 220. In the example of FIG. 2, the UE 115-a may include four different areas 220, and each area 220 may include a respective power safety exposure threshold. The UE 115-a may calculate transmit power budgets per area 220.

The UE 115-a may autonomously determine the areas 220. Alternatively, in some cases, the areas 220 may be indicated to the UE 115-a (e.g., via control signaling). The UE 115-a may, in some examples, dynamically adjust allocation or designation of the areas 220 over time. In some examples, the areas 220 may be based on active antenna ports or antenna elements of the UE 115-a. For example, the area 220-a may include a first set of antenna elements, the area 220-b may include a second set of antenna elements, the area 220-c may include a third set of antenna elements, and the area 220-d may include a fourth set of antenna elements. The antenna elements in each area 220 may form an antenna group. In some examples, each antenna group may be mapped to or associated with one or more active antenna ports of the UE 115-a.

The UE 115-a may transmit one or more uplink messages 225 to the network entity 105-a to indicate the areas 220, the antenna groups, or both. In some examples, a first uplink message 225 may indicate one or more active antenna ports that are available for wireless communications at the UE 115-a and a second uplink message 225 may indicate one or more antenna groups that are associated with the active antenna ports. The second uplink message 225 may additionally, or alternatively, indicate respective transmit power thresholds for each antenna group. In some examples, the UE 115-a may transmit one or more TPMIs via the uplink messages 225 to indicate the antenna groups, as described in further detail elsewhere herein, including with reference to FIG. 3.

The network entity 105-a may schedule uplink transmissions by the UE 115-a using the one or more antenna groups based on the uplink messages 225. For example, the network entity 105-a may transmit a control message 235 or some other signaling to the UE 115-a to indicate which antenna group the UE 115-a should use for subsequent uplink transmissions. The network entity 105-a may schedule uplink transmissions by the UE 115-a using different antenna groups over time. For example, the network entity 105-a may schedule the UE 115-a to transmit at a full transmit power using a first antenna group at a first time, and the network entity 105-a may subsequently instruct the UE 115-a to switch to transmitting at a full transmit power using a second antenna group at a second time. The first antenna group may be within a first area 220-*a*, and the second antenna group may be within a second area 220-*a*. In some examples, the network entity 105-*a* may indicate a set of two or more antenna groups and a periodicity for the UE 115-*a* to switch between the antenna groups.

The antenna groups utilized consecutively by the UE 115-*a* may, in some examples, be spaced at a distance away from each other (e.g., a threshold distance between antenna groups) to support transmission at a full transmit power while satisfying RF exposure thresholds, such as SAR, MPE, and power density. For example, the area 220-*a* may be sufficiently spaced away from the area 220-*c* such that the UE 115-*a* may transmit using a first antenna group associated with the area 220-*a* at a full transmission power, and the UE 115-*a* may consecutively switch to transmitting using a second antenna group associated with the area 220-*c* at a full transmission power without exceeding the RF exposure thresholds.

In some examples, the UE 115-*a* may transmit one or more transmission power reports 230 to the network entity 105-*a*, and each transmission power report 230 may include transmit power information for a respective antenna group. The transmit power information may include, for example, a PHR, a power density threshold (e.g., a SAR, an MPE), a relative transmit power budget, a maximum time period over which the respective antenna group may transmit at a full transmission power, or any combination thereof. The relative transmit power budget may indicate a difference between a transmit power associated with uplink transmissions using the respective antenna group (e.g., a current transmission power) and a respective transmit power threshold configured for the antenna group.

The UE 115-*a* may transmit the transmission power reports 230 dynamically or semi-statically. For example, the UE 115-*a* may transmit different transmission power reports 230 for each antenna group over time to indicate a current PHR or power density budget relative to a threshold budget (e.g., how much PHR or power density is left for a respective antenna group before the threshold is satisfied). The network entity 105-*a* may utilize the transmit power information indicated via the transmission power reports 230 to determine which antenna groups to schedule for a subsequent uplink transmission by the UE 115-*a*. For example, if a PHR or power density threshold for a first antenna group associated with the area 220-*a* is satisfied, the network entity 105-*a* may indicate that the UE 115-*a* is to switch to transmitting using a different antenna group associated with a different area 220, such as the area 220-*b* or the area 220-*c*.

The UE 115-*a* may transmit an uplink message 225 or some other uplink signaling to indicate one or more metrics associated with a channel at an antenna port of the UE 115-*a* that maps to a respective antenna group of the UE 115-*a*. The one or more metrics may include an RSRP level, or some other channel metrics. The network entity 105-*a* may determine which antenna group or antenna port to activate at the UE 115-*a* based on the one or more reported channel metrics and a power density budget associated with each antenna group. In some examples, the network entity 105-*a* may indicate, via a control message 235, an antenna group to activate based on a TPMI that is mapped to the antenna group. In some examples, the TPMI may be associated with one or more transmission and/or reception beams 205. Aspects related to antenna grouping and TPMI reporting are described in further detail elsewhere herein, including with reference to FIG. 3.

The UE 115-*a* may thereby identify and report information regarding antenna groups of the UE 115-*a* that may each be associated with a respective set of RF exposure regulations or thresholds. The UE 115-*a* may group antenna elements within each area 220 and the network entity 105-*a* may schedule transmissions by the UE 115-*a* using different groups of antenna elements over time, such that the UE 115-*a* may continuously or near-continuously transmit uplink transmissions using a near full transmit power while reducing RF exposure to a user.

Figure 3:
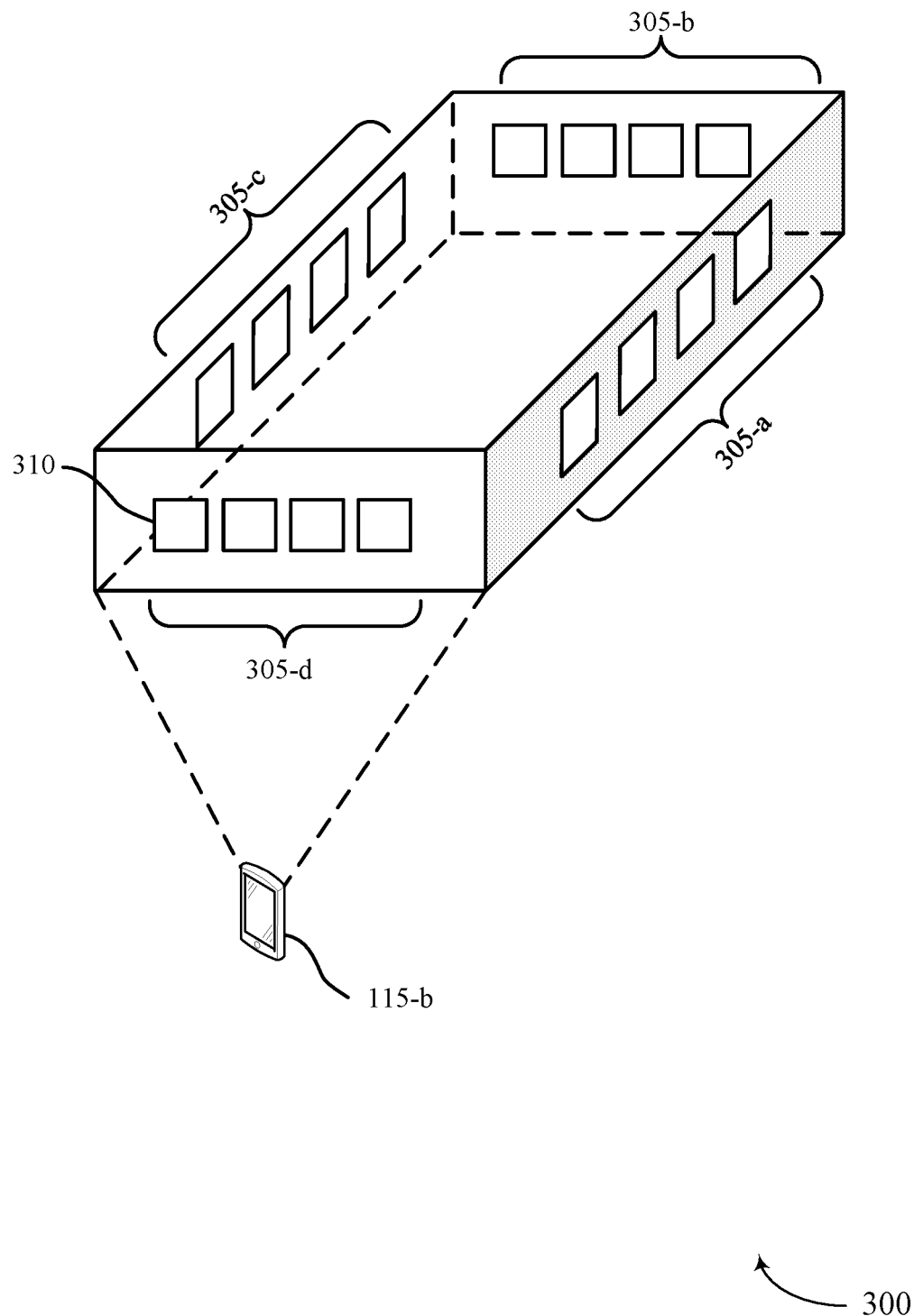
FIG. 3 illustrates an example of an antenna element grouping configuration that supports antenna grouping for power management in wireless communications in accordance with one or more aspects of the present disclosure.

FIG. 3 illustrates an example of an antenna element grouping configuration 300 that supports antenna grouping for power management in wireless communications in accordance with one or more aspects of the present disclosure. The antenna element grouping configuration 300 may implement or be implemented by aspects of the wireless communications system 100 or 200. For example, the antenna element grouping configuration 300 illustrates a UE 115-*b*, which may represent an example of a UE 115 as described with reference to FIGS. 1 and 2. The UE 115-*b* may include multiple antenna elements 310, which may be located or deployed across one or more antenna modules 305. In some examples, the UE 115-*b* may group antenna elements 310 to form antenna groups for power management, as described with reference to FIG. 2.

In the example of FIG. 3, the UE 115-*b* may include four antenna modules 305 (e.g., antenna modules 305-*a*, 305-*b*, 305-*c*, and 305-*d*). In some examples, each side or portion of a UE 115 may include one or more antenna modules 305. Each antenna module 305 may represent a panel or modular array of antenna elements 310. The antenna elements 310 of the UE 115-*b* may be associated with or mapped to one or more power amplifiers and corresponding antenna ports available for communications at the UE 115-*b*.

As described herein, the UE 115-*b* may identify or form antenna groups. Each antenna group may include one or more antenna elements 310. The antenna elements 310 within a same antenna group may be within a same antenna module 305, different antenna modules 305, or both. For example, if the antenna groups are formed based on a physical area or region, such as the areas 220 described with reference to FIG. 2, the antenna elements 310 within a group may be located within a same antenna module 305 or two or more antenna modules 305 that are relatively proximate to one another. As described with reference to FIG. 2, RF exposure thresholds, PHR, SAR, and MPE, may be applied per antenna group (e.g., due to the antenna groups being associated with or located within different areas of the UE 115-*b*). For example, as described with reference to Equation 2, a sum of a normalized SAR exposure and a normalized power density exposure may be less than a threshold for a given antenna group. In some examples, power density budgets (e.g., a transmission power threshold) for different antenna groups may be different. In the example of FIG. 3, a first antenna group associated with the module 305-*a* may be configured with a relatively small power density budget and a second antenna group associated with the module 305-*c* may be configured with a relatively higher power density budget. As such, the UE 115-*b* may transmit at a higher transmission power or for a longer time period using the second antenna group than the first antenna group.

The UE 115-*b* may transmit messages or other signaling to a network entity 105 to indicate available antenna ports at the UE 115-*b* and antenna groups that map to the available antenna ports, as described with reference to FIG. 2. In some examples described herein, the UE 115-*b* may use TPMIs to indicate the antenna groups. A TPMI may correspond to a matrix including multiple entries that indicate which antenna ports are to be activated at a UE 115 for subsequent uplink transmissions. TPMIs may be used, in some examples, for beam and/or antenna port selection for uplink communications (e.g., during uplink MIMO communications). For example, a network entity 105 may transmit one or more TPMIs to the UE 115-b to indicate which antenna ports or corresponding beams the UE 115-b should use for an uplink transmission. In the example of FIG. 3, if the UE 115-b includes four antenna ports, a TPMI for the UE 115-b may include four entries. In such cases, a TPMI of [1, 1, 1, 1] may indicate that the UE 115-b is to activate and utilize all four antenna ports for a scheduled transmission. A TPMI of [0, 1, 0, 1] may indicate that the UE 115-b is to activate and utilize a second antenna port and a fourth antenna port (e.g., associated with the antenna modules 305-b and 305-d, for example).

The TPMIs may, in some examples, be configured according to one of two classes based on power scaling rules. For example, a first class of TPMIs may, in some examples, be full-power TPMIs, which may be configured with power scaling rules that support transmissions at a full transmit power using all or a subset of antenna ports (e.g., the full transmit power may be drawn from a subset of antenna ports). A UE 115 that includes two power amplifiers or antenna ports may utilize TPMIs with two entries. In such cases, the TPMIs [1 0] and [0 1] may be full power capable TPMIs that activate transmissions at full power using a first antenna port and a second antenna port of the UE 115, respectively. A second class of TPMIs may, in some examples, follow a different set of power scaling rules that, for example, provide for transmit power to be scaled up or down based on a quantity of overall antenna ports that are activated. In such cases, the TPMI [1 0] may activate transmissions from a first antenna port at a transmit power that is scaled down from the full transmit power by a factor of one half (e.g., transmit using half the power from one antenna port).

To improve antenna grouping techniques described herein, the UE 115-b may transmit an uplink message to a network entity 105 to indicate a set of one or more TPMIs that are associated with each antenna group. The set of one or more TPMIs may map the respective antenna group to a set of one or more antenna ports of the UE 115-b. For example, if the UE 115-b allocates two antenna groups that are each mapped to a single respective antenna port (e.g., a two-port UE 115), the UE 115-b may indicate the TPMI [1 0] for the first antenna group and the TPMI [0 1] for the second antenna group. The TPMI [1 1] may thereby activate both antenna groups. In the example of FIG. 3, the antenna elements 310 in the module 305-a and the module 305-b may correspond to a first antenna group mapped to a first antenna port and the antenna elements 310 in the antenna module 305-c and the antenna module 305-d may correspond to a second antenna group mapped to a second antenna port.

As another example, if the UE 115-b allocates two antenna groups that each map to two antenna ports (e.g., a four-port UE 115), the TPMIs may each include four entries (e.g., one for each port). In such cases, more than one TPMI may map to a same antenna group. For example, each antenna module 305 in FIG. 3 may be associated with a different antenna port, such that the antenna module 305-a is associated with a first antenna port, the antenna module 305-b is associated with a second antenna port, the antenna module 305-c is associated with a third antenna port, and the antenna module 305-d is associated with a fourth antenna port. In some examples, the antenna modules 305-a and 305-c may form a first antenna group, and the antenna modules 305-b and 305-d may form a second antenna group. In such cases, both the second and fourth antenna ports may be associated with the second antenna group. As such, the UE 115-b may indicate, to the network entity 105, that the TPMIs of [0, 1, 0, 0,], [0, 0, 0, 1], [0, 1, 0, 1], and any other TPMI that activates the second antenna port, the fourth antenna port, or both, maps to the second antenna group. In some examples, each TPMI may correspond to a respective index value, and the UE 115-b may report index values for TPMIs that map to each antenna group.

The network entity 105 may utilize the indications of TPMIs and antenna groups from the UE 115-b to schedule uplink communications by the UE 115-b that satisfy RF exposure thresholds. The network entity 105 may indicate which antenna group should be activated by the UE 115-b for a given transmission by indicating one or more TPMIs that map to the respective antenna group. Grouping the antenna elements 310 as described herein may provide for improved transmission power and throughput. For example, as described with respect to FIG. 2, power density and PHR thresholds may be applied per antenna group. As such, the UE 115-b may dynamically report a PHR and power density per antenna group, and the network entity 105 may dynamically instruct the UE 115-b to switch between antenna groups for uplink transmissions based on the respective transmission power thresholds and corresponding reported budgets for each antenna group, such that each antenna group may satisfy the transmission power thresholds while overall transmission power from the UE 115-b is increased.

The network entity 105 may select which TPMI or beam (e.g., which antenna port or group) should be used by the UE 115-b based on one or more channel conditions. For example, the UE 115-b may transmit signaling that indicates one or more metrics associated with a channel at a respective antenna port of the UE 115-b. In some examples, the UE 115-b may transmit an indication of a set of channel metrics for channels associated with each antenna group. The channel metrics may include an RSRP measurement, or one or more other channel metrics. The network entity 105 may select which TPMI and corresponding antenna group to active based on, for example, which channel has a higher reported channel strength (e.g., RSRP metric), or some other channel metric, and a power density budget of the antenna group. That is, the network entity 105 may consider both the channel metrics and the power density budget of a corresponding antenna group to select a TPMI value.

The power density budget may be based on transmission power information reported by the UE 115-b for one or more antenna groups, as described with reference to FIG. 2. In some examples, the UE 115-b may report transmission power information based on a most recent physical uplink shared channel (PUSCH) transmission by the UE 115-b. For example, the UE 115-b may receive, from the network entity 105 an indication of a TPMI, the UE 115-b may transmit a PUSCH based on the TPMI (e.g., using a corresponding antenna group), and the UE 115-b may subsequently transmit a transmission power report for the antenna group that maps to the TPMI based on the PUSCH transmission being more recent than other transmissions by the UE 115-b. The UE 115-b may additionally, or alternatively, report transmission power information for one or more other antenna groups.

In some examples, the PHR or power density budgets for the one or more other antenna groups may be derived or inferred by the network entity 105-b based on the reported PHR or power budget reported for a first antenna group. In such cases, the UE 115 may refrain from reporting PHR for each TPMI value. For example, if a UE 115 that includes two antenna ports and supports 26 dBm and 23 dBm power amplifiers declares a TPMI value of [1 0] (e.g., a first antenna port) to be full power capable (e.g., 3 dB), a PHR for the other antenna port (e.g., a TPMI value of [0 1]) may be derived to be zero.

The UE 115-*b* may thereby report groups of antenna elements 310 to a network entity 105 to use for scheduling subsequent uplink transmissions. By grouping antenna elements 310 based on physical locations, areas (e.g., SAR regions), or some other metric, the UE 115-*b* may apply transmission power thresholds and RF exposure limits on a per-antenna group basis. In some examples, the UE 115-*b* may report TPMIs that map to each antenna group to facilitate scheduling by the network entity 105. The network entity 105 may schedule transmissions by the UE 115-*b* using different or alternating antenna groups over time to maximize transmission power while reducing exposure to a user.

Figure 4:
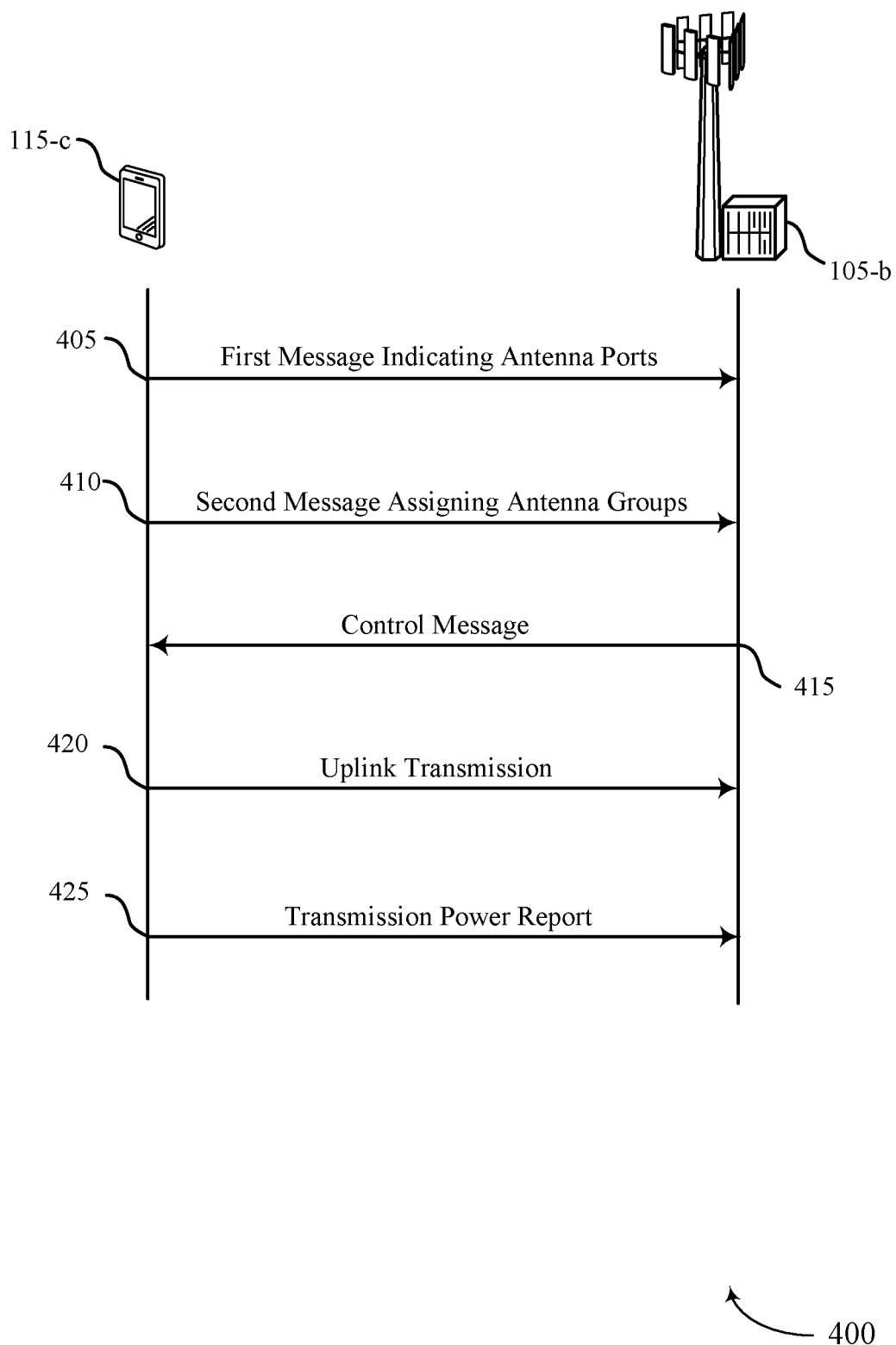
FIG. 4 illustrates an example of a process flow that supports antenna grouping for power management in wireless communications in accordance with one or more aspects of the present disclosure.

FIG. 4 illustrates an example of a process flow 400 that supports antenna grouping for power management in wireless communications in accordance with one or more aspects of the present disclosure. In some examples, the process flow 400 may implement or be implemented by aspects of the wireless communications systems 100 or 200, as described with reference to FIGS. 1 and 2. For example, the process flow 400 illustrates communications between a UE 115-*c* and a network entity 105-*b*, which may represent examples of corresponding devices described with reference to FIGS. 1-3. In some examples, the UE 115-*c* may support antenna grouping for power management.

In the following description of the process flow 400, the operations between the UE 115-*c* and the network entity 105-*b* may be performed in different orders or at different times. Some operations may also be left out of the process flow 400, or other operations may be added. Although the UE 115-*c* and the network entity 105-*b* are shown performing the operations of the process flow 400, some examples of some operations may also be performed by one or more other wireless devices.

At 405, the UE 115-*c* may transmit, to the network entity 105-*b*, a first message that indicates a set of multiple antenna ports available for the wireless communications at the UE 115-*c*. The indication of multiple available antenna ports at the UE 115-*c* may, in some examples, indicate that the UE 115-*c* supports uplink MIMO communications.

At 410, the UE 115-*c* may transmit, to the network entity 105-*b*, a second message that indicates a set of multiple antenna groups associated with the available antenna ports at the UE 115-*c*. Each of the antenna groups may include a respective set of one or more antenna elements and may be associated with a respective transmit power threshold. In some examples, each of the antenna groups may be associated with a respective physical location or region of the UE 115-*c*. For example, the UE 115-*c* may group the antenna elements based on physical regions, as described with reference to FIGS. 2 and 3. Though shown as separate messages in the example of FIG. 4, in some examples, the contents of the first message at 405 and the second message at 410 may be transmitted as a single message.

At 415, in some examples, the network entity 105-*b* may transmit, to the UE 115-*c*, a control message that indicates a first antenna group of the set of multiple antenna groups reported via the second message. In some examples, the network entity 105-*b* may select the first antenna group based on one or more channel metrics, a power density budget associated with the first antenna group, or both.

At 420, the UE 115-*c* may transmit one or more uplink transmissions using the first antenna group of the multiple antenna groups. The UE 115-*c* may use the first antenna group for the uplink transmissions based on the control message, in some examples. In some examples, the control message may indicate an alternating or periodic pattern of antenna groups, and the UE 115-*c* may switch between antenna groups for the uplink transmissions based on the indicated pattern or set. Additionally, or alternatively, the UE 115-*c* may receive one or more other control messages from the network entity 105-*b* that indicate other antenna groups, and the UE 115-*c* may transmit subsequent uplink transmissions using the other antenna groups accordingly.

At 425, in some examples, the UE 115-*c* may transmit one or more transmission power reports. The transmission power reports may each include transmit power information for a respective antenna group at the UE 115-*c*. The transmit power information may include, for example, a PHR for the respective antenna group, a power density threshold for the respective antenna group, or both. The power density threshold may be associated with a SAR, an MPE, or both. In some examples, the UE 115-*c* may transmit the transmission power reports before transmitting the uplink transmissions. In such cases, the network entity 105-*b* may select an antenna group for the UE 115-*c* to use for the uplink transmissions based on the transmission power reports.

Each antenna group may be associated with a respective transmit power budget, such as a respective PHR, power density threshold, or both. As such, by grouping antenna elements as described herein, the UE 115-*c* and the network entity 105-*b* may support improved throughput while satisfying transmit power thresholds configured for user safety.

Figure 5:
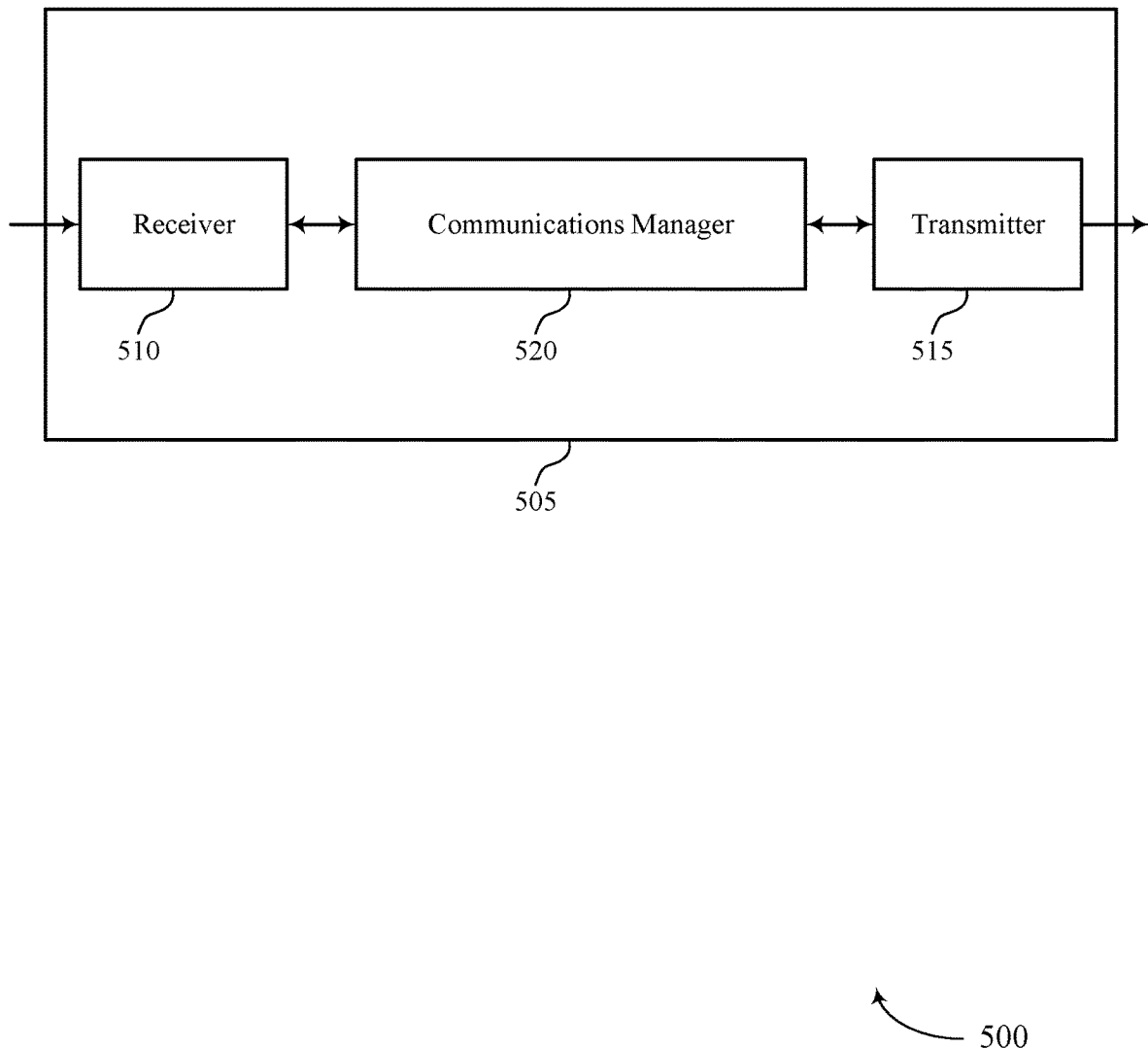
FIGS. 5 and 6 show block diagrams of devices that support antenna grouping for power management in wireless communications in accordance with one or more aspects of the present disclosure.

FIG. 5 shows a block diagram 500 of a device 505 that supports antenna grouping for power management in wireless communications in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to antenna grouping for power management in wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to antenna grouping for power management in wireless communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of antenna grouping for power management in wireless communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

Additionally, or alternatively, the communications manager 520 may support wireless communications at a UE in accordance with examples as disclosed herein. For example, the communications manager 520 may be configured as or otherwise support a means for transmitting a first message that indicates a set of multiple antenna ports available for the wireless communications at the UE. The communications manager 520 may be configured as or otherwise support a means for transmitting a second message that indicates a set of multiple antenna groups associated with the set of multiple antenna ports, where the set of multiple antenna groups include respective sets of one or more antenna elements and are associated with respective transmit power thresholds. The communications manager 520 may be configured as or otherwise support a means for transmitting, after transmitting the first message and the second message, one or more uplink transmissions using a first antenna group of the set of multiple antenna groups.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, reduced power consumption, more efficient utilization of communication resources, improved throughput, improved communication reliability, reduced RF exposure, and improved uplink transmission power, among other advantages.

Figure 6:
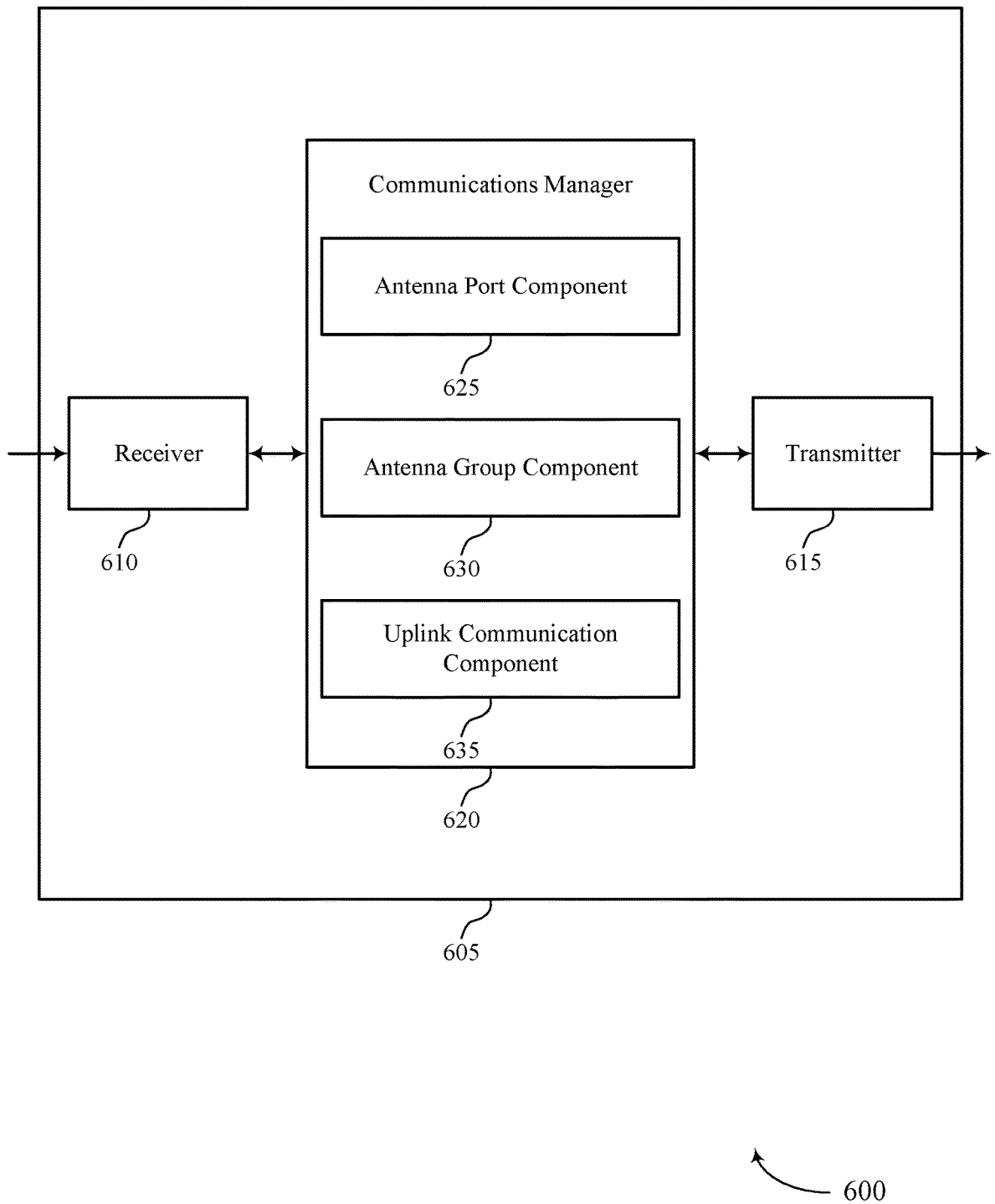

FIG. 6 shows a block diagram 600 of a device 605 that supports antenna grouping for power management in wireless communications in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to antenna grouping for power management in wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to antenna grouping for power management in wireless communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of antenna grouping for power management in wireless communications as described herein. For example, the communications manager 620 may include an antenna port component 625, an antenna group component 630, an uplink communication component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The antenna port component 625 may be configured as or otherwise support a means for transmitting a first message that indicates a set of multiple antenna ports available for the wireless communications at the UE. The antenna group component 630 may be configured as or otherwise support a means for transmitting a second message that indicates a set of multiple antenna groups associated with the set of multiple antenna ports, where the set of multiple antenna groups include respective sets of one or more antenna elements and are associated with respective transmit power thresholds. The uplink communication component 635 may be configured as or otherwise support a means for transmitting, after transmitting the first message and the second message, one or more uplink transmissions using a first antenna group of the set of multiple antenna groups.

Figure 7:
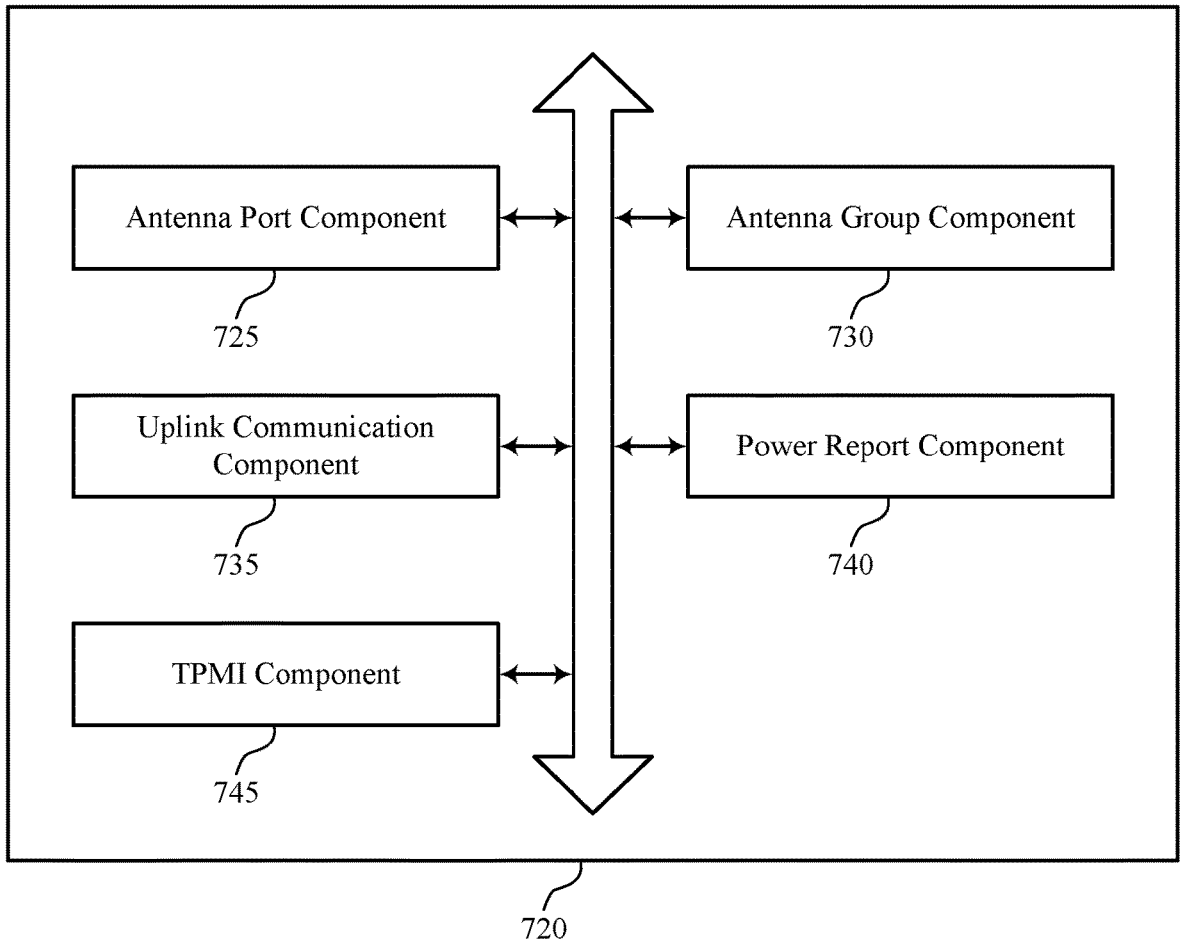
FIG. 7 shows a block diagram of a communications manager that supports antenna grouping for power management in wireless communications in accordance with one or more aspects of the present disclosure.

FIG. 7 shows a block diagram 700 of a communications manager 720 that supports antenna grouping for power management in wireless communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of antenna grouping for power management in wireless communications as described herein. For example, the communications manager 720 may include an antenna port component 725, an antenna group component 730, an uplink communication component 735, a power report component 740, a TPMI component 745, or any combination thereof. Each of these components may communicate, directly or indirectly, with one another (e.g., via one or more buses).

Additionally, or alternatively, the communications manager 720 may support wireless communications at a UE in accordance with examples as disclosed herein. The antenna port component 725 may be configured as or otherwise support a means for transmitting a first message that indicates a set of multiple antenna ports available for the wireless communications at the UE. The antenna group component 730 may be configured as or otherwise support a means for transmitting a second message that indicates a set of multiple antenna groups associated with the set of multiple antenna ports, where the set of multiple antenna groups include respective sets of one or more antenna elements and are associated with respective transmit power thresholds. The uplink communication component 735 may be configured as or otherwise support a means for transmitting, after transmitting the first message and the second message, one or more uplink transmissions using a first antenna group of the set of multiple antenna groups.

In some examples, the antenna group component 730 may be configured as or otherwise support a means for receiving, based on the first message and the second message, a control message that indicates the first antenna group of the set of multiple antenna groups, where transmitting the one or more uplink transmissions using the first antenna group is based on the control message.

In some examples, the power report component 740 may be configured as or otherwise support a means for transmitting one or more transmission power reports that each include transmit power information for a respective antenna group of the set of multiple antenna groups.

In some examples, the transmit power information in each transmission power report indicates a PHR for the respective antenna group. In some examples, the transmit power information in each transmission power report indicates a power density threshold for the respective antenna group, the power density threshold associated with a SAR, an MPE, or both.

In some examples, the TPMI component 745 may be configured as or otherwise support a means for receiving a control message that indicates a first TPMI associated with the first antenna group. In some examples, the uplink communication component 735 may be configured as or otherwise support a means for transmitting a first uplink transmission using the first antenna group based on the control message, where the one or more transmission power reports include at least a first transmission power report including first transmit power information for the first antenna group based on the first uplink transmission using the first antenna group being a most recent uplink transmission by the UE.

In some examples, the transmit power information in each transmission power report corresponds to a difference between a transmit power associated with uplink transmissions using the respective antenna group and the respective transmit power threshold for the respective antenna group. In some examples, the transmit power information in each transmission power report corresponds to a maximum time period associated with transmitting the one or more uplink transmissions at a first transmit power.

In some examples, the TPMI component 745 may be configured as or otherwise support a means for transmitting, for each antenna group of the set of multiple antenna groups indicated via the second message, a set of one or more TPMIs associated with the antenna group, where the set of one or more TPMIs maps the antenna group to a respective set of one or more antenna ports of the set of multiple antenna ports at the UE.

In some examples, the TPMI component 745 may be configured as or otherwise support a means for receiving a control message that indicates a first TPMI associated with the first antenna group based on transmitting the set of one or more TPMIs for each antenna group, where transmitting the one or more uplink transmissions using the first antenna group is based on the control message indicating the first TPMI.

In some examples, the antenna port component 725 may be configured as or otherwise support a means for transmitting signaling that indicates one or more metrics associated with a channel at a first antenna port of the UE that maps to the first antenna group. In some examples, the TPMI component 745 may be configured as or otherwise support a means for receiving, based on the one or more metrics associated with the channel at the first antenna port and the respective transmit power threshold for the first antenna group, a control message that indicates a first TPMI associated with the first antenna group, where transmitting the one or more uplink transmissions using the first antenna group is based on the control message indicating the first TPMI.

In some examples, the first TPMI is associated with the first antenna group and one or more other antenna groups of the set of multiple antenna groups, and the antenna group component 730 may be configured as or otherwise support a means for selecting the first antenna group based on the first TPMI and a first power density threshold associated with the first antenna group being less than power density thresholds associated with each of the one or more other antenna groups.

In some examples, the respective transmit power threshold for each antenna group is based on a sum of a normalized SAR exposure and a normalized power density exposure for the antenna group. In some examples, the set of multiple antenna groups are associated with respective physical locations at the UE.

Figure 8:
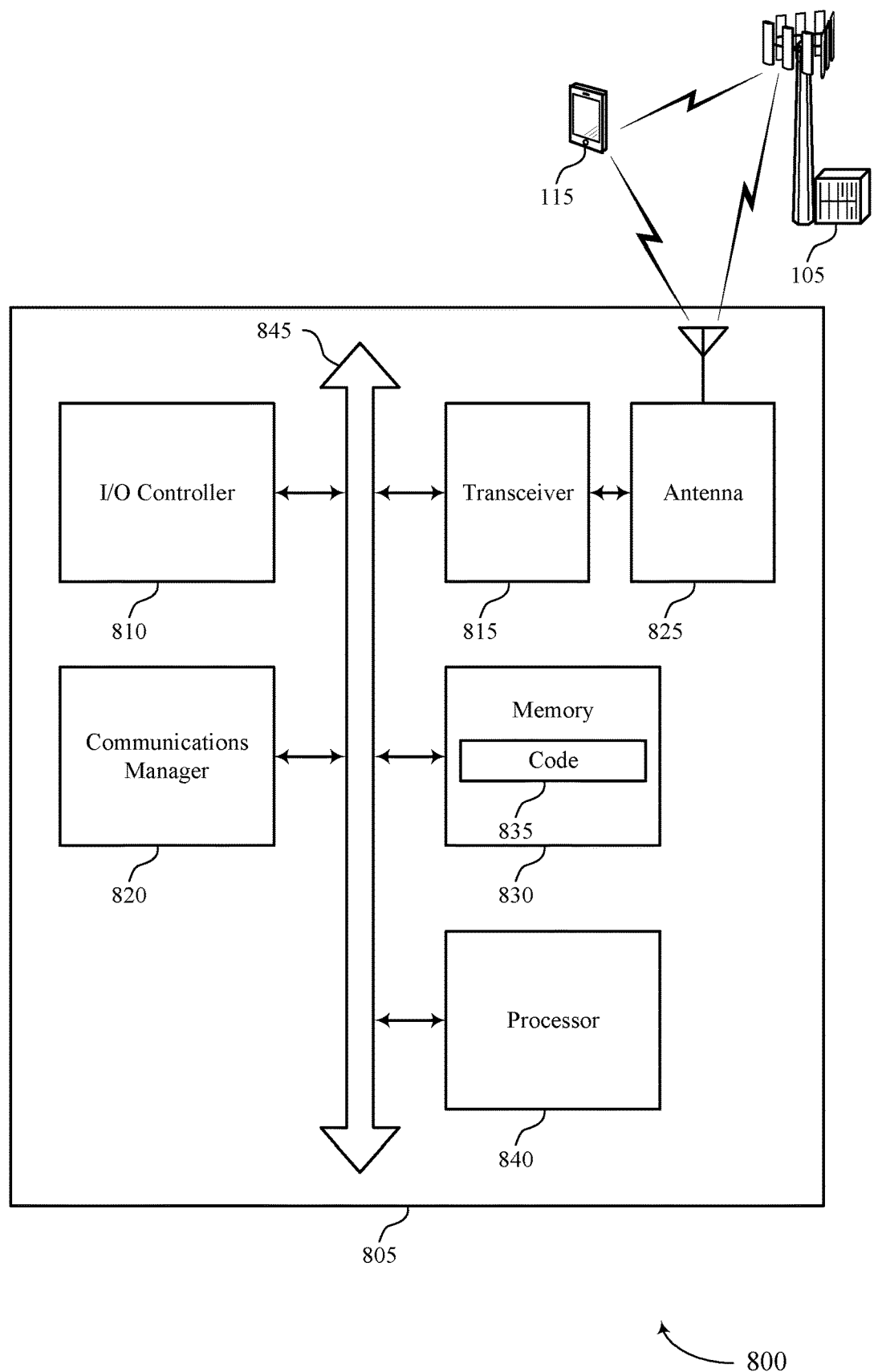
FIG. 8 shows a diagram of a system including a device that supports antenna grouping for power management in wireless communications in accordance with one or more aspects of the present disclosure.

FIG. 8 shows a diagram of a system 800 including a device 805 that supports antenna grouping for power management in wireless communications in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting antenna grouping for power management in wireless communications). For example, the device 805 or a component of the device 805 may include a processor 840 and memory 830 coupled with or to the processor 840, the processor 840 and memory 830 configured to perform various functions described herein.

Additionally, or alternatively, the communications manager 820 may support wireless communications at a UE in accordance with examples as disclosed herein. For example, the communications manager 820 may be configured as or otherwise support a means for transmitting a first message that indicates a set of multiple antenna ports available for the wireless communications at the UE. The communications manager 820 may be configured as or otherwise support a means for transmitting a second message that indicates a set of multiple antenna groups associated with the set of multiple antenna ports, where the set of multiple antenna groups include respective sets of one or more antenna elements and are associated with respective transmit power thresholds. The communications manager 820 may be configured as or otherwise support a means for transmitting, after transmitting the first message and the second message, one or more uplink transmissions using a first antenna group of the set of multiple antenna groups.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of antenna grouping for power management in wireless communications as described herein, or the processor 840 and the memory 830 may be otherwise configured to perform or support such operations.

Figure 9:
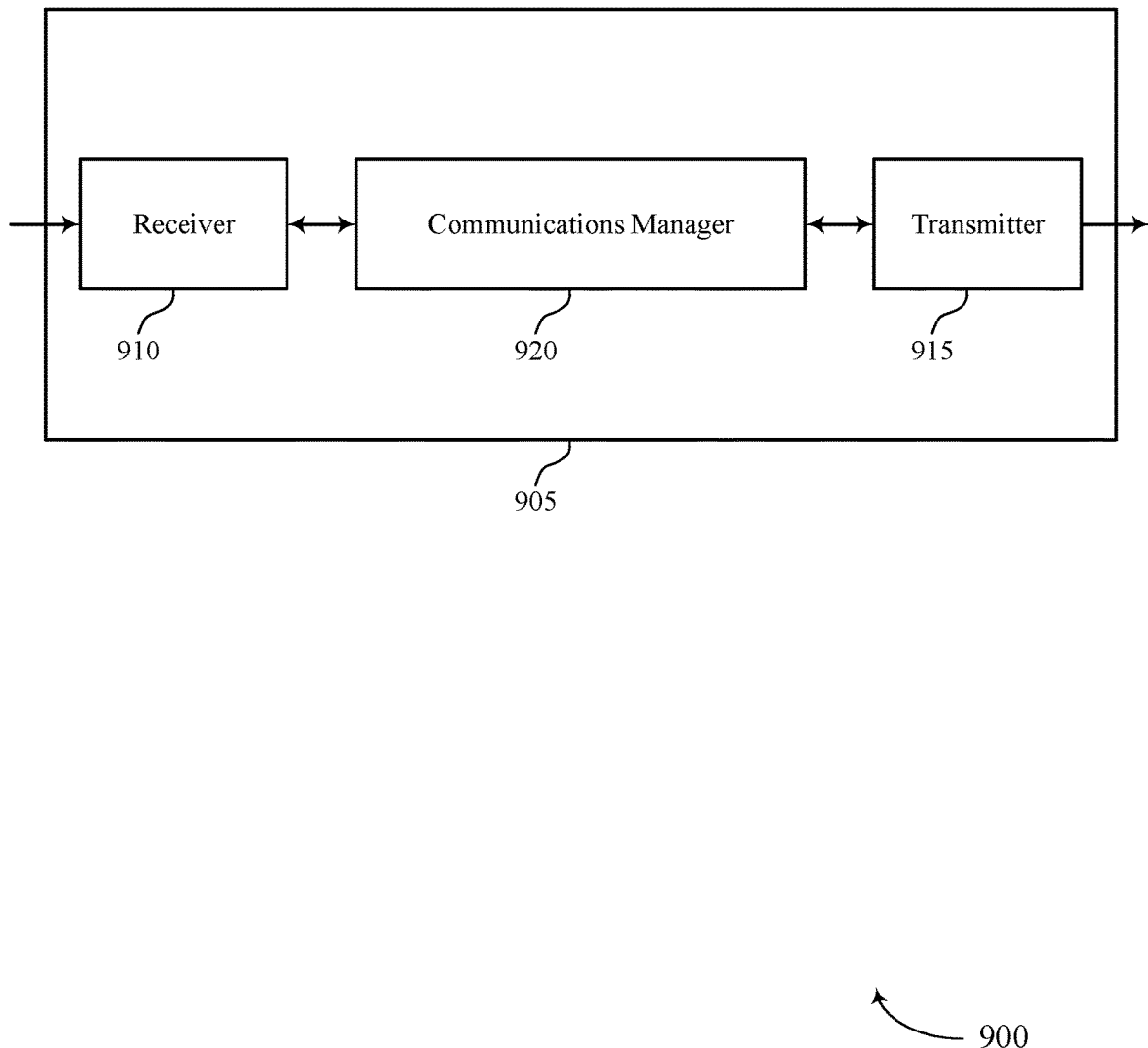
FIGS. 9 and 10 show block diagrams of devices that support antenna grouping for power management in wireless communications in accordance with one or more aspects of the present disclosure.

FIG. 9 shows a block diagram 900 of a device 905 that supports antenna grouping for power management in wireless communications in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of antenna grouping for power management in wireless communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

Additionally, or alternatively, the communications manager 920 may support wireless communications at a network entity in accordance with examples as disclosed herein. For example, the communications manager 920 may be configured as or otherwise support a means for receiving a first message that indicates a set of multiple antenna ports at a UE that are available for the wireless communications. The communications manager 920 may be configured as or otherwise support a means for receiving a second message that indicates a set of multiple antenna groups associated with the set of multiple antenna ports, where the set of multiple antenna groups include respective sets of one or more antenna elements and are associated with respective transmit power thresholds. The communications manager 920 may be configured as or otherwise support a means for receiving, after receiving the first message and the second message, one or more uplink transmissions from a first antenna group of the set of multiple antenna groups.

Figure 10:
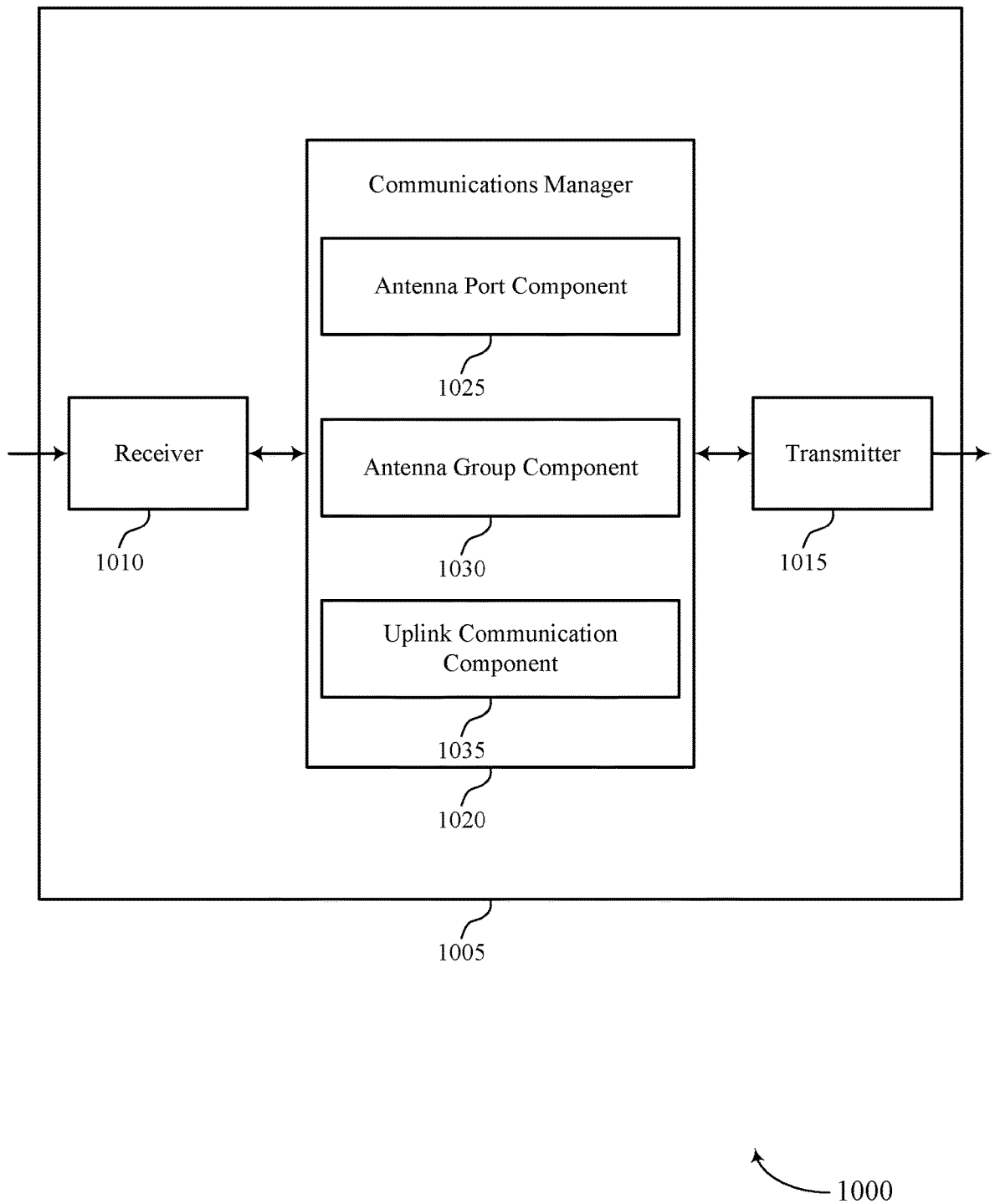

FIG. 10 shows a block diagram 1000 of a device 1005 that supports antenna grouping for power management in wireless communications in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of antenna grouping for power management in wireless communications as described herein. For example, the communications manager 1020 may include an antenna port component 1025, an antenna group component 1030, an uplink communication component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The antenna port component 1025 may be configured as or otherwise support a means for receiving a first message that indicates a set of multiple antenna ports at a UE that are available for the wireless communications. The antenna group component 1030 may be configured as or otherwise support a means for receiving a second message that indicates a set of multiple antenna groups associated with the set of multiple antenna ports, where the set of multiple antenna groups include respective sets of one or more antenna elements and are associated with respective transmit power thresholds. The uplink communication component 1035 may be configured as or otherwise support a means for receiving, after receiving the first message and the second message, one or more uplink transmissions from a first antenna group of the set of multiple antenna groups.

Figure 11:
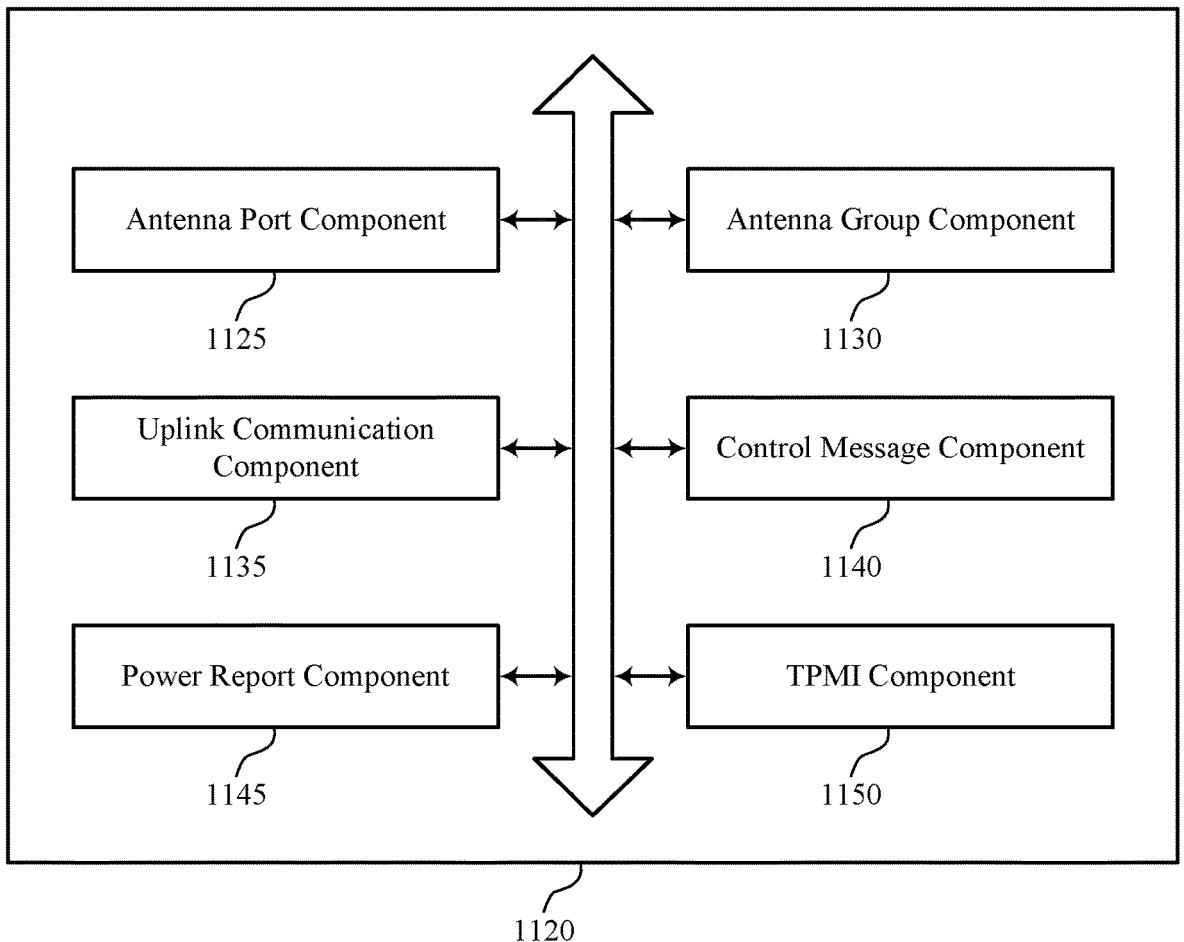
FIG. 11 shows a block diagram of a communications manager that supports antenna grouping for power management in wireless communications in accordance with one or more aspects of the present disclosure.

FIG. 11 shows a block diagram 1100 of a communications manager 1120 that supports antenna grouping for power management in wireless communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of antenna grouping for power management in wireless communications as described herein. For example, the communications manager 1120 may include an antenna port component 1125, an antenna group component 1130, an uplink communication component 1135, a control message component 1140, a power report component 1145, a TPMI component 1150, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

Additionally, or alternatively, the communications manager 1120 may support wireless communications at a network entity in accordance with examples as disclosed herein. The antenna port component 1125 may be configured as or otherwise support a means for receiving a first message that indicates a set of multiple antenna ports at a UE that are available for the wireless communications. The antenna group component 1130 may be configured as or otherwise support a means for receiving a second message that indicates a set of multiple antenna groups associated with the set of multiple antenna ports, where the set of multiple antenna groups include respective sets of one or more antenna elements and are associated with respective transmit power thresholds. The uplink communication component 1135 may be configured as or otherwise support a means for receiving, after receiving the first message and the second message, one or more uplink transmissions from a first antenna group of the set of multiple antenna groups.

In some examples, the antenna group component 1130 may be configured as or otherwise support a means for selecting, based on the first message and the second message, the first antenna group of the set of multiple antenna groups for the UE to use for the one or more uplink transmissions. In some examples, the control message component 1140 may be configured as or otherwise support a means for transmitting a control message that indicates the first antenna group, where receiving the one or more uplink transmissions from the first antenna group is based on the control message indicating the first antenna group.

In some examples, the power report component 1145 may be configured as or otherwise support a means for receiving one or more transmission power reports each including transmit power information for a respective antenna group of the set of multiple antenna groups. In some examples, the transmit power information in each transmission power report indicates a PHR for the respective antenna group. In some examples, the transmit power information in each transmission power report indicates a power density threshold for the respective antenna group, the power density threshold associated with a SAR, an MPE, or both.

In some examples, the TPMI component 1150 may be configured as or otherwise support a means for transmitting a control message that indicates a first TPMI associated with the first antenna group. In some examples, the uplink communication component 1135 may be configured as or otherwise support a means for receiving a first uplink transmission from the first antenna group based on the control message indicating the first TPMI, where the one or more transmission power reports include at least a first transmission power report including first transmit power information for the first antenna group based on the first uplink transmission using the first antenna group being a most recent uplink transmission by the UE.

In some examples, the transmit power information in each transmission power report corresponds to a difference between a transmit power associated with uplink transmissions using the respective antenna group and the respective transmit power threshold for the respective antenna group. In some examples, the transmit power information in each transmission power report corresponds to a maximum time period associated with transmission of the one or more uplink transmissions at a first transmit power.

In some examples, the TPMI component 1150 may be configured as or otherwise support a means for receiving, for each antenna group of the set of multiple antenna groups indicated via the second message, a set of one or more TPMIs associated with the antenna group, where the set of one or more TPMIs maps the antenna group to a respective set of one or more antenna ports of the set of multiple antenna ports at the UE.

In some examples, the control message component 1140 may be configured as or otherwise support a means for transmitting a control message that indicates a first TPMI associated with the first antenna group based on receiving the set of one or more TPMIs for each antenna group, where receiving the one or more uplink transmissions from the first antenna group is based on the control message indicating the first TPMI.

In some examples, the TPMI component 1150 may be configured as or otherwise support a means for selecting, from a set of multiple TPMIs, a first TPMI associated with the first antenna group based on an indication of one or more metrics associated with a channel at a first antenna port of the UE that maps to the first antenna group and the respective transmit power threshold for the first antenna group. In some examples, the control message component 1140 may be configured as or otherwise support a means for transmitting, based on the selecting, a control message that indicates a first TPMI associated with the first antenna group, where receiving the one or more uplink transmissions from the first antenna group is based on the control message indicating the first TPMI.

In some examples, the respective transmit power threshold for each antenna group is based on a sum of a normalized SAR exposure and a normalized power density exposure for the antenna group. In some examples, the set of multiple antenna groups are associated with respective physical locations on the UE.

Figure 12:
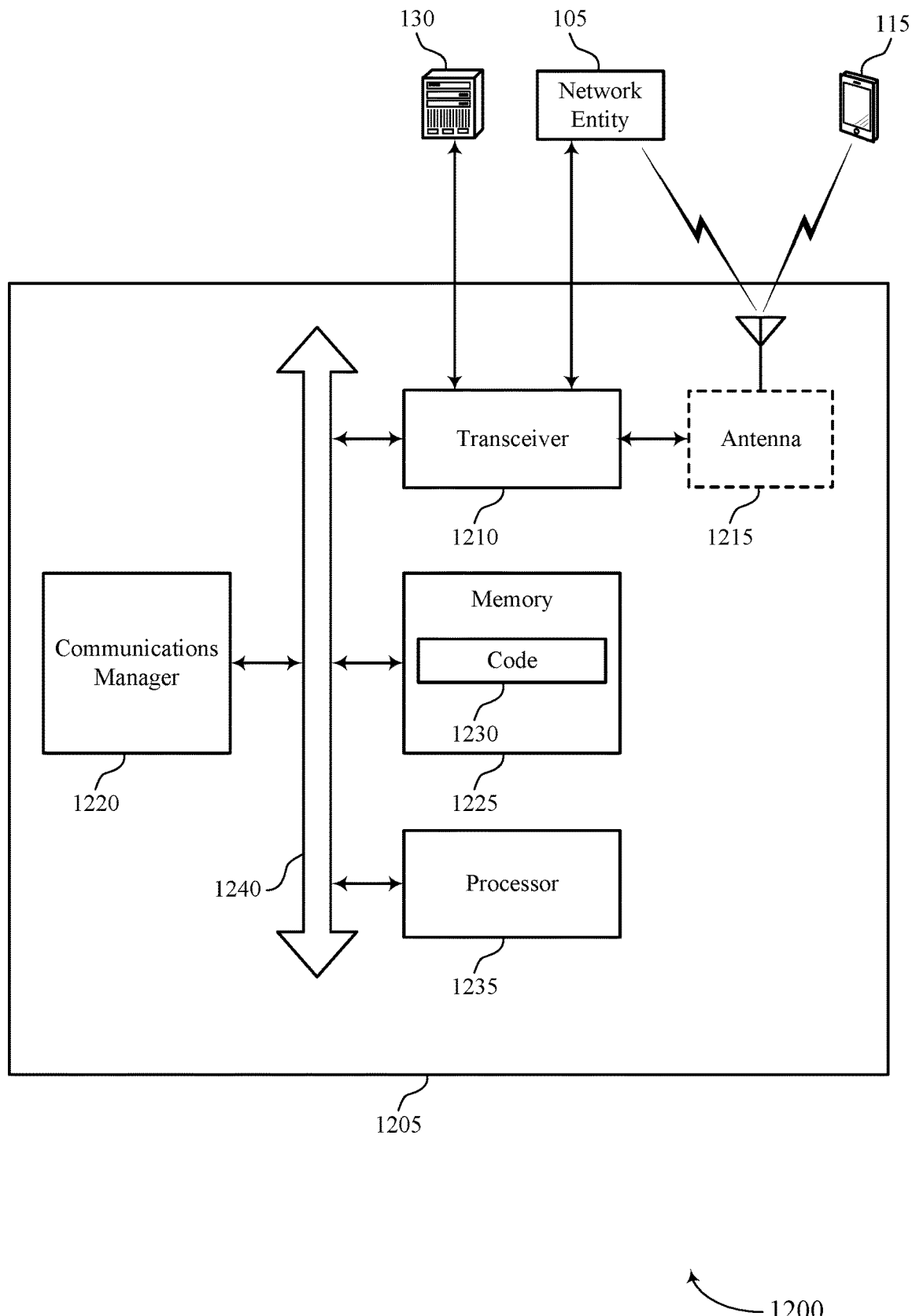
FIG. 12 shows a diagram of a system including a device that supports antenna grouping for power management in wireless communications in accordance with one or more aspects of the present disclosure.

FIG. 12 shows a diagram of a system 1200 including a device 1205 that supports antenna grouping for power management in wireless communications in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting antenna grouping for power management in wireless communications). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

Additionally, or alternatively, the communications manager 1220 may support wireless communications at a network entity in accordance with examples as disclosed herein. For example, the communications manager 1220 may be configured as or otherwise support a means for receiving a first message that indicates a set of multiple antenna ports at a UE that are available for the wireless communications. The communications manager 1220 may be configured as or otherwise support a means for receiving a second message that indicates a set of multiple antenna groups associated with the set of multiple antenna ports, where the set of multiple antenna groups include respective sets of one or more antenna elements and are associated with respective transmit power thresholds. The communications manager 1220 may be configured as or otherwise support a means for receiving, after receiving the first message and the second message, one or more uplink transmissions from a first antenna group of the set of multiple antenna groups.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of antenna grouping for power management in wireless communications as described herein, or the processor 1235 and the memory 1225 may be otherwise configured to perform or support such operations.

Figure 13:
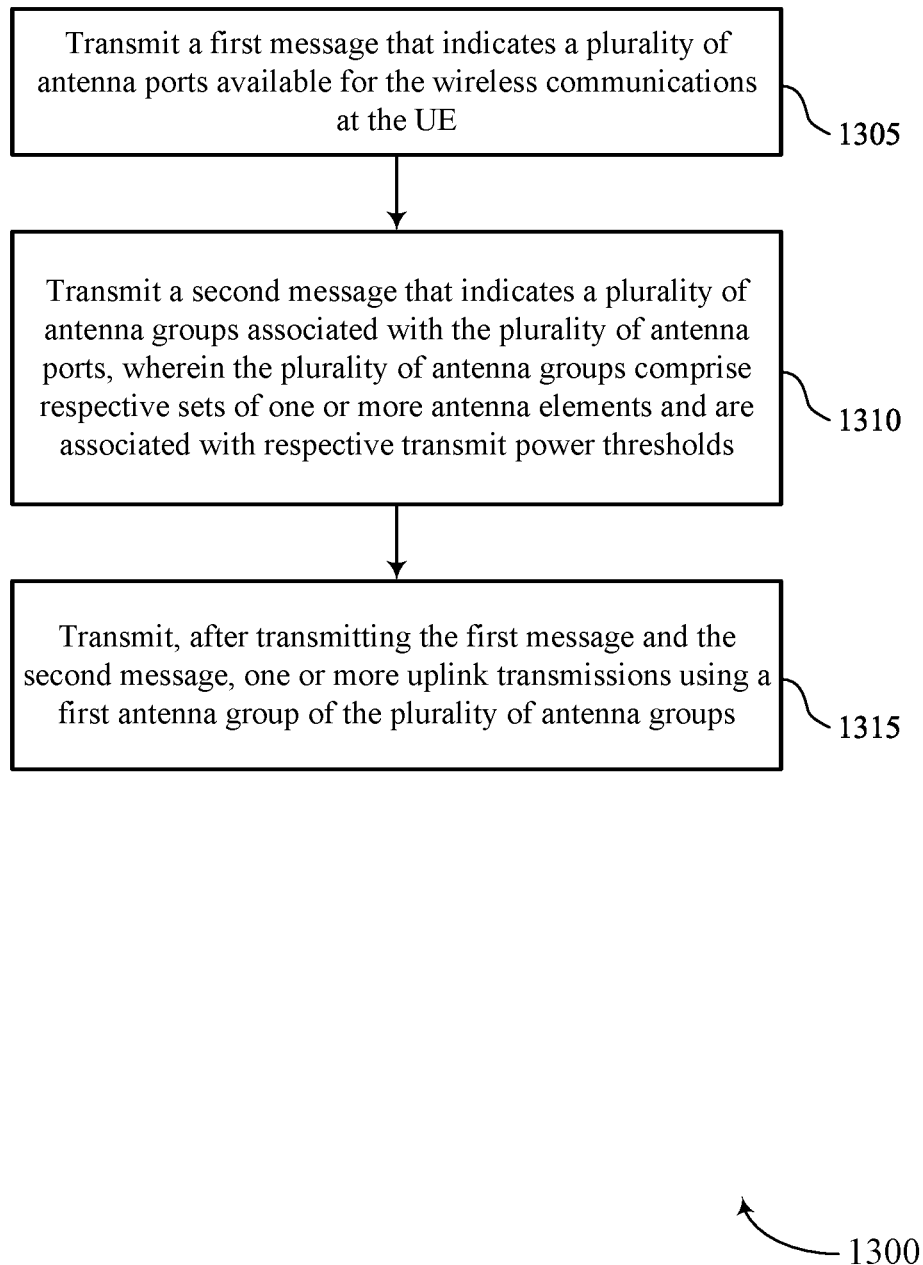
FIGS. 13 through 17 show flowcharts illustrating methods that support antenna grouping for power management in wireless communications in accordance with one or more aspects of the present disclosure.

FIG. 13 shows a flowchart illustrating a method 1300 that supports antenna grouping for power management in wireless communications in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting a first message that indicates a set of multiple antenna ports available for the wireless communications at the UE. The operations of 1305 may be performed in accordance with examples as disclosed herein. In some examples, aspects of the operations of 1305 may be performed by an antenna port component 725 as described with reference to FIG. 7.

At 1310, the method may include transmitting a second message that indicates a set of multiple antenna groups associated with the set of multiple antenna ports, where the set of multiple antenna groups include respective sets of one or more antenna elements and are associated with respective transmit power thresholds. The operations of 1310 may be performed in accordance with examples as disclosed herein. In some examples, aspects of the operations of 1310 may be performed by an antenna group component 730 as described with reference to FIG. 7.

At 1315, the method may include transmitting, after transmitting the first message and the second message, one or more uplink transmissions using a first antenna group of the set of multiple antenna groups. The operations of 1315 may be performed in accordance with examples as disclosed herein. In some examples, aspects of the operations of 1315 may be performed by an uplink communication component 735 as described with reference to FIG. 7.

Figure 14:
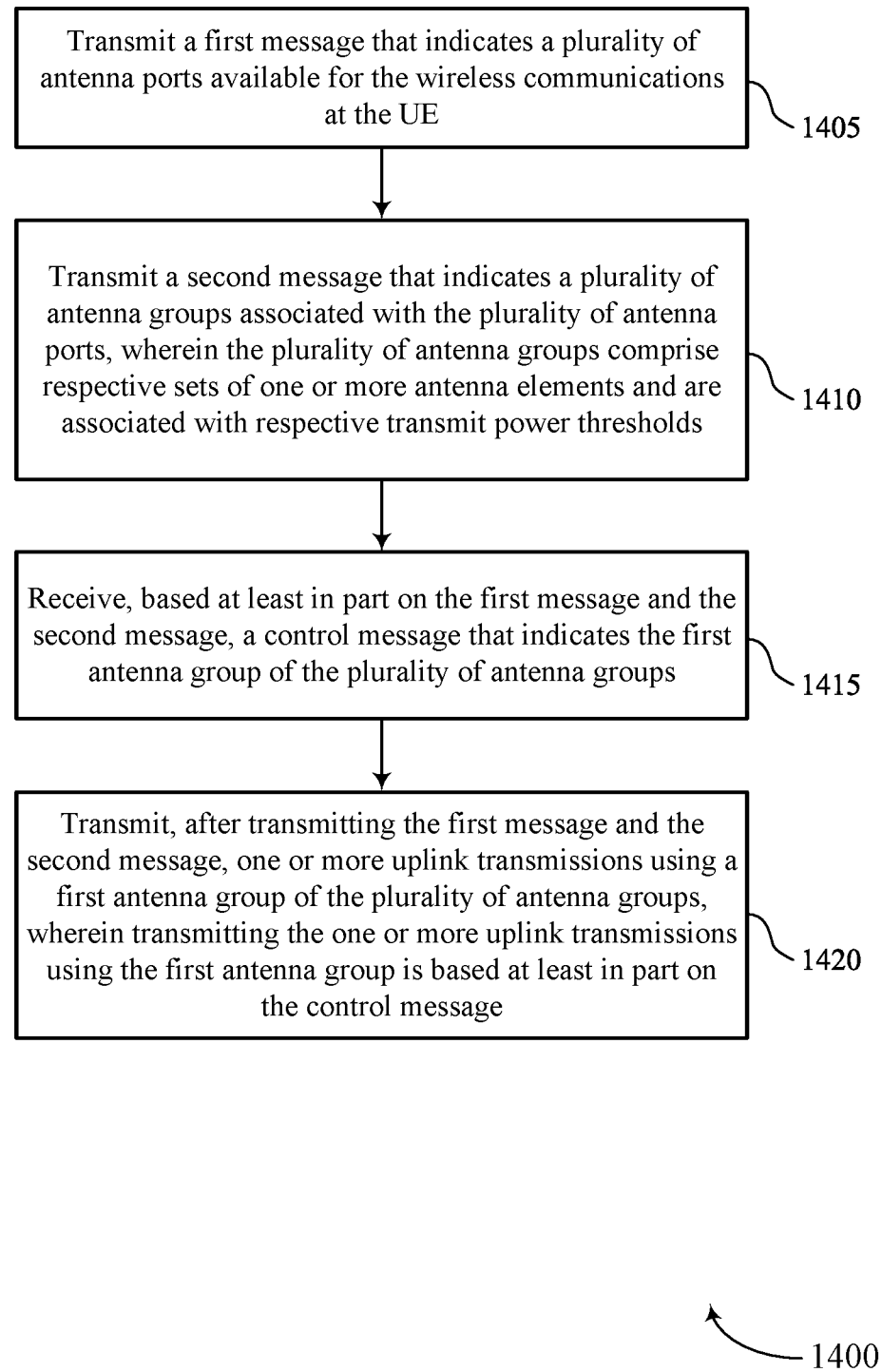

FIG. 14 shows a flowchart illustrating a method 1400 that supports antenna grouping for power management in wireless communications in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting a first message that indicates a set of multiple antenna ports available for the wireless communications at the UE. The operations of 1405 may be performed in accordance with examples as disclosed herein. In some examples, aspects of the operations of 1405 may be performed by an antenna port component 725 as described with reference to FIG. 7.

At 1410, the method may include transmitting a second message that indicates a set of multiple antenna groups associated with the set of multiple antenna ports, where the set of multiple antenna groups include respective sets of one or more antenna elements and are associated with respective transmit power thresholds. The operations of 1410 may be performed in accordance with examples as disclosed herein. In some examples, aspects of the operations of 1410 may be performed by an antenna group component 730 as described with reference to FIG. 7.

At 1415, the method may include receiving, based on the first message and the second message, a control message that indicates the first antenna group of the set of multiple antenna groups. The operations of 1415 may be performed in accordance with examples as disclosed herein. In some examples, aspects of the operations of 1415 may be performed by an antenna group component 730 as described with reference to FIG. 7.

At 1420, the method may include transmitting, after transmitting the first message and the second message, one or more uplink transmissions using a first antenna group of the set of multiple antenna groups. In some examples, transmitting the one or more uplink transmissions using the first antenna group may be based on the control message. The operations of 1420 may be performed in accordance with examples as disclosed herein. In some examples, aspects of the operations of 1420 may be performed by an uplink communication component 735 as described with reference to FIG. 7.

Figure 15:
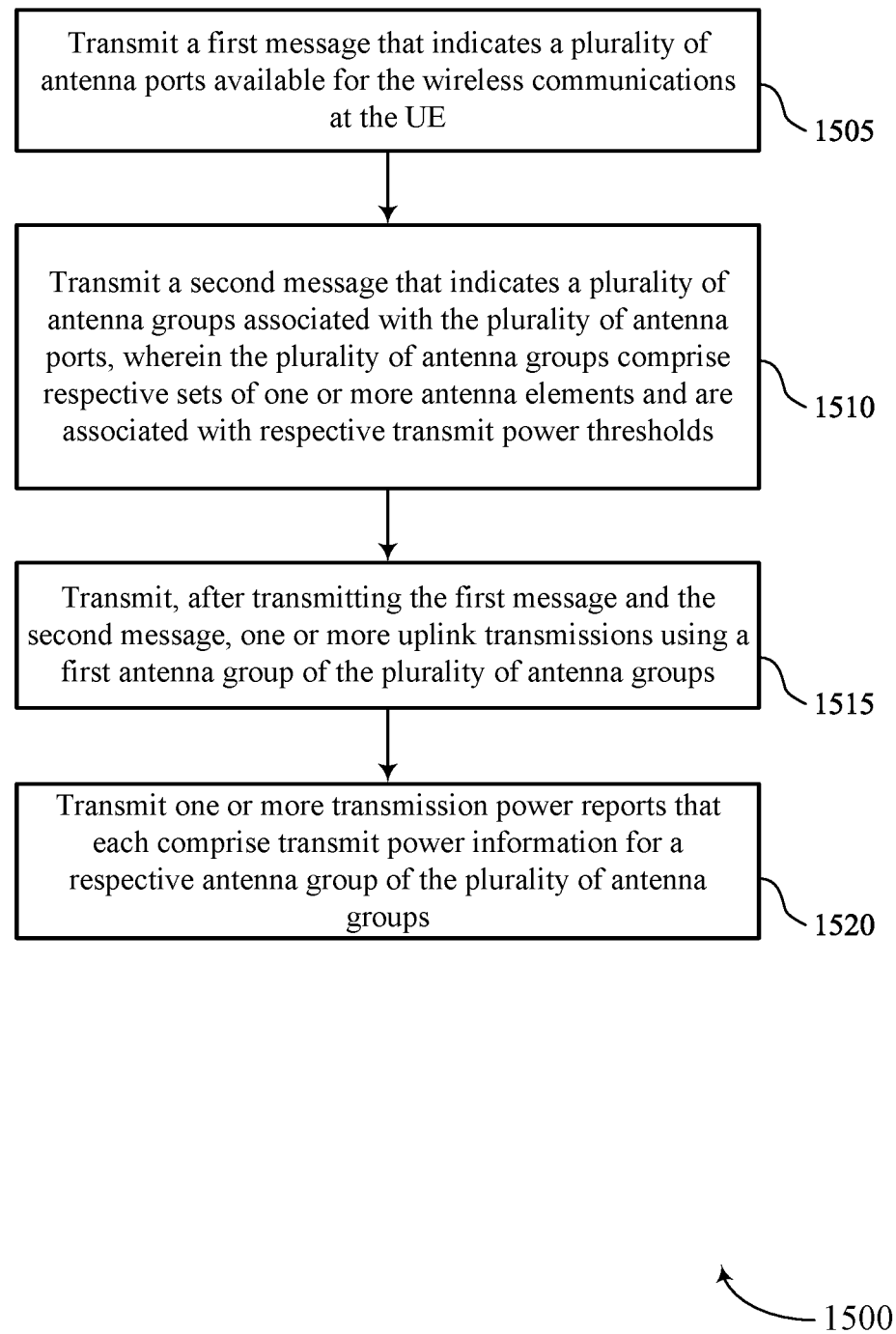

FIG. 15 shows a flowchart illustrating a method 1500 that supports antenna grouping for power management in wireless communications in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include transmitting a first message that indicates a set of multiple antenna ports available for the wireless communications at the UE. The operations of 1505 may be performed in accordance with examples as disclosed herein. In some examples, aspects of the operations of 1505 may be performed by an antenna port component 725 as described with reference to FIG. 7.

At 1510, the method may include transmitting a second message that indicates a set of multiple antenna groups associated with the set of multiple antenna ports, where the set of multiple antenna groups include respective sets of one or more antenna elements and are associated with respective transmit power thresholds. The operations of 1510 may be performed in accordance with examples as disclosed herein. In some examples, aspects of the operations of 1510 may be performed by an antenna group component 730 as described with reference to FIG. 7.

At 1515, the method may include transmitting, after transmitting the first message and the second message, one or more uplink transmissions using a first antenna group of the set of multiple antenna groups. The operations of 1515 may be performed in accordance with examples as disclosed herein. In some examples, aspects of the operations of 1515 may be performed by an uplink communication component 735 as described with reference to FIG. 7.

At 1520, the method may include transmitting one or more transmission power reports that each include transmit power information for a respective antenna group of the set of multiple antenna groups. The operations of 1520 may be performed in accordance with examples as disclosed herein. In some examples, aspects of the operations of 1520 may be performed by a power report component 740 as described with reference to FIG. 7.

Figure 16:
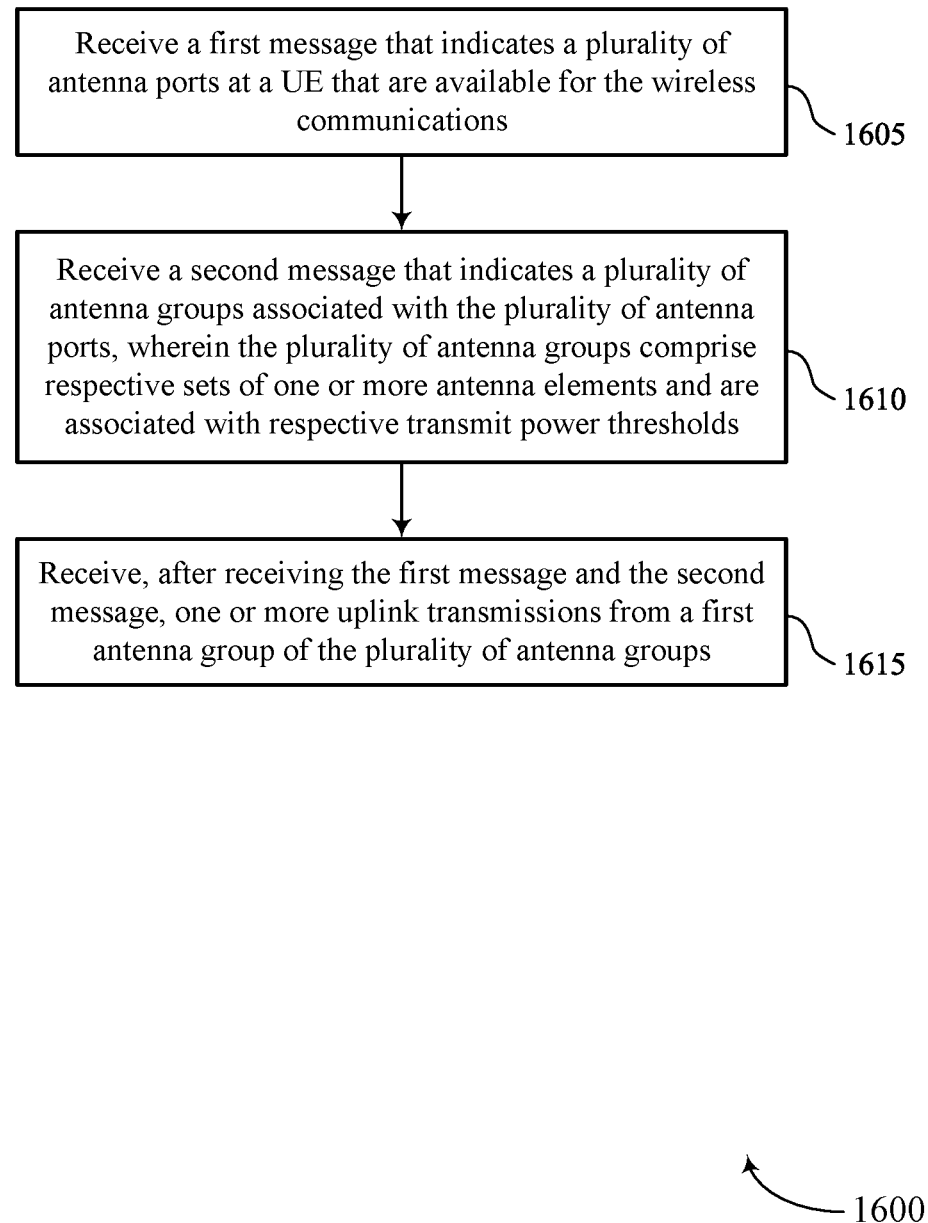

FIG. 16 shows a flowchart illustrating a method 1600 that supports antenna grouping for power management in wireless communications in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include receiving a first message that indicates a set of multiple antenna ports at a UE that are available for the wireless communications. The operations of 1605 may be performed in accordance with examples as disclosed herein. In some examples, aspects of the operations of 1605 may be performed by an antenna port component 1125 as described with reference to FIG. 11.

At 1610, the method may include receiving a second message that indicates a set of multiple antenna groups associated with the set of multiple antenna ports, where the set of multiple antenna groups include respective sets of one or more antenna elements and are associated with respective transmit power thresholds. The operations of 1610 may be performed in accordance with examples as disclosed herein. In some examples, aspects of the operations of 1610 may be performed by an antenna group component 1130 as described with reference to FIG. 11.

At 1615, the method may include receiving, after receiving the first message and the second message, one or more uplink transmissions from a first antenna group of the set of multiple antenna groups. The operations of 1615 may be performed in accordance with examples as disclosed herein. In some examples, aspects of the operations of 1615 may be performed by an uplink communication component 1135 as described with reference to FIG. 11.

Figure 17:
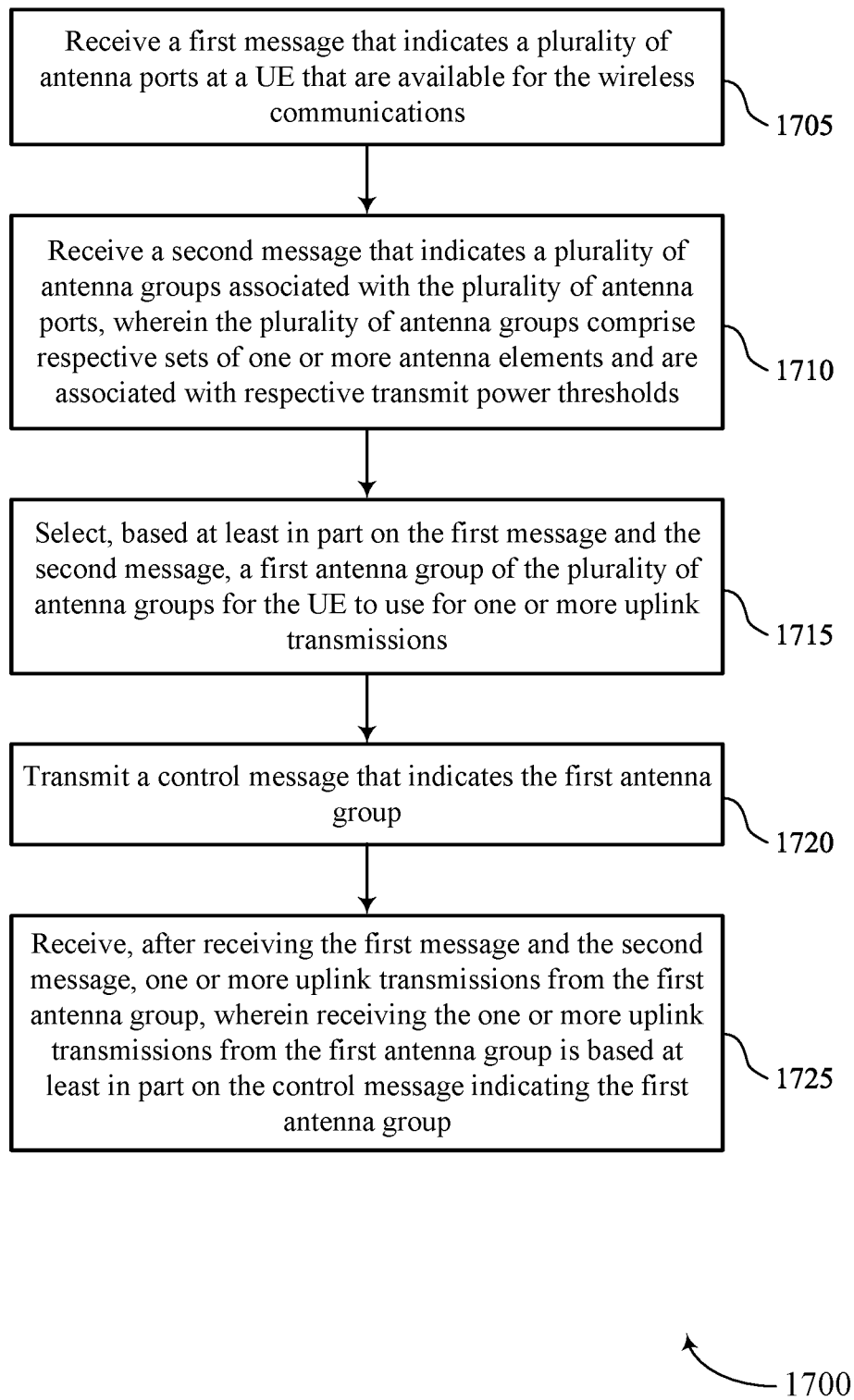

FIG. 17 shows a flowchart illustrating a method 1700 that supports antenna grouping for power management in wireless communications in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include receiving a first message that indicates a set of multiple antenna ports at a UE that are available for the wireless communications. The operations of 1705 may be performed in accordance with examples as disclosed herein. In some examples, aspects of the operations of 1705 may be performed by an antenna port component 1125 as described with reference to FIG. 11.

At 1710, the method may include receiving a second message that indicates a set of multiple antenna groups associated with the set of multiple antenna ports, where the set of multiple antenna groups include respective sets of one or more antenna elements and are associated with respective transmit power thresholds. The operations of 1710 may be performed in accordance with examples as disclosed herein. In some examples, aspects of the operations of 1710 may be performed by an antenna group component 1130 as described with reference to FIG. 11.

At 1715, the method may include selecting, based on the first message and the second message, a first antenna group of the set of multiple antenna groups for the UE to use for one or more uplink transmissions. The operations of 1715 may be performed in accordance with examples as disclosed herein. In some examples, aspects of the operations of 1715 may be performed by an antenna group component 1130 as described with reference to FIG. 11.

At 1720, the method may include transmitting a control message that indicates the first antenna group. The operations of 1720 may be performed in accordance with examples as disclosed herein. In some examples, aspects of the operations of 1720 may be performed by a control message component 1140 as described with reference to FIG. 11.

At 1725, the method may include receiving, after receiving the first message and the second message, one or more uplink transmissions from the first antenna group. In some examples, receiving the one or more uplink transmissions from the first antenna group may be based on the control message indicating the first antenna group. The operations of 1725 may be performed in accordance with examples as disclosed herein. In some examples, aspects of the operations of 1725 may be performed by an uplink communication component 1135 as described with reference to FIG. 11.

The following provides an overview of aspects of the present disclosure:

Aspect 1: A method for wireless communications at a UE, comprising: transmitting a first message that indicates a plurality of antenna ports available for the wireless communications at the UE; transmitting a second message that indicates a plurality of antenna groups associated with the plurality of antenna ports, wherein the plurality of antenna groups comprise respective sets of one or more antenna elements and are associated with respective transmit power thresholds; and transmitting, after transmitting the first message and the second message, one or more uplink transmissions using a first antenna group of the plurality of antenna groups.

Aspect 2: The method of aspect 1, further comprising: receiving, based at least in part on the first message and the second message, a control message that indicates the first antenna group of the plurality of antenna groups, wherein transmitting the one or more uplink transmissions using the first antenna group is based at least in part on the control message.

Aspect 3: The method of any of aspects 1 through 2, further comprising: transmitting one or more transmission power reports that each comprise transmit power information for a respective antenna group of the plurality of antenna groups.

Aspect 4: The method of aspect 3, wherein the transmit power information in each transmission power report indicates a power headroom for the respective antenna group.

Aspect 5: The method of any of aspects 3 through 4, wherein the transmit power information in each transmission power report indicates a power density threshold for the respective antenna group, the power density threshold associated with a specific absorption rate, a maximum permissible exposure, or both.

Aspect 6: The method of any of aspects 3 through 5, further comprising: receiving a control message that indicates a first transmit precoding matrix indicator associated with the first antenna group; and transmitting a first uplink transmission using the first antenna group based at least in part on the control message, wherein the one or more transmission power reports include at least a first transmission power report comprising first transmit power information for the first antenna group based at least in part on the first uplink transmission using the first antenna group being a most recent uplink transmission by the UE.

Aspect 7: The method of any of aspects 3 through 6, wherein the transmit power information in each transmission power report corresponds to a difference between a transmit power associated with uplink transmissions using the respective antenna group and the respective transmit power threshold for the respective antenna group.

Aspect 8: The method of any of aspects 3 through 7, wherein the transmit power information in each transmission power report corresponds to a maximum time period associated with transmitting the one or more uplink transmissions at a first transmit power.

Aspect 9: The method of any of aspects 1 through 8, further comprising: transmitting, for each antenna group of the plurality of antenna groups indicated via the second message, a set of one or more transmit precoding matrix indicators associated with the antenna group, wherein the set of one or more transmit precoding matrix indicators maps the antenna group to a respective set of one or more antenna ports of the plurality of antenna ports at the UE.

Aspect 10: The method of aspect 9, further comprising: receiving a control message that indicates a first transmit precoding matrix indicator associated with the first antenna group based at least in part on transmitting the set of one or more transmit precoding matrix indicators for each antenna group, wherein transmitting the one or more uplink transmissions using the first antenna group is based at least in part on the control message indicating the first transmit precoding matrix indicator.

Aspect 11: The method of any of aspects 1 through 10, further comprising: transmitting signaling that indicates one or more metrics associated with a channel at a first antenna port of the UE that maps to the first antenna group; and receiving, based at least in part on the one or more metrics associated with the channel at the first antenna port and the respective transmit power threshold for the first antenna group, a control message that indicates a first transmit precoding matrix indicator associated with the first antenna group, wherein transmitting the one or more uplink transmissions using the first antenna group is based at least in part on the control message indicating the first transmit precoding matrix indicator.

Aspect 12: The method of aspect 11, wherein the first transmit precoding matrix indicator is associated with the first antenna group and one or more other antenna groups of the plurality of antenna groups, the method further comprising: selecting the first antenna group based at least in part on the first transmit precoding matrix indicator and a first power density threshold associated with the first antenna group being less than power density thresholds associated with each of the one or more other antenna groups.

Aspect 13: The method of any of aspects 1 through 12, wherein the respective transmit power threshold for each antenna group is based at least in part on a sum of a normalized specific absorption rate exposure and a normalized power density exposure for the antenna group.

Aspect 14: The method of any of aspects 1 through 13, wherein the plurality of antenna groups are associated with respective physical locations at the UE.

Aspect 15: A method for wireless communications at a network entity, comprising: receiving a first message that indicates a plurality of antenna ports at a UE that are available for the wireless communications; receiving a second message that indicates a plurality of antenna groups associated with the plurality of antenna ports, wherein the plurality of antenna groups comprise respective sets of one or more antenna elements and are associated with respective transmit power thresholds; and receiving, after receiving the first message and the second message, one or more uplink transmissions from a first antenna group of the plurality of antenna groups.

Aspect 16: The method of aspect 15, further comprising: selecting, based at least in part on the first message and the second message, the first antenna group of the plurality of antenna groups for the UE to use for the one or more uplink transmissions; and transmitting a control message that indicates the first antenna group, wherein receiving the one or more uplink transmissions from the first antenna group is based at least in part on the control message indicating the first antenna group.

Aspect 17: The method of any of aspects 15 through 16, further comprising: receiving one or more transmission power reports each comprising transmit power information for a respective antenna group of the plurality of antenna groups.

Aspect 18: The method of aspect 17, wherein the transmit power information in each transmission power report indicates a power headroom for the respective antenna group.

Aspect 19: The method of any of aspects 17 through 18, wherein the transmit power information in each transmission power report indicates a power density threshold for the respective antenna group, the power density threshold associated with a specific absorption rate, a maximum permissible exposure, or both.

Aspect 20: The method of any of aspects 17 through 19, further comprising: transmitting a control message that indicates a first transmit precoding matrix indicator associated with the first antenna group; and receiving a first uplink transmission from the first antenna group based at least in part on the control message indicating the first transmit precoding matrix indicator, wherein the one or more transmission power reports include at least a first transmission power report comprising first transmit power information for the first antenna group based at least in part on the first uplink transmission using the first antenna group being a most recent uplink transmission by the UE.

Aspect 21: The method of any of aspects 17 through 20, wherein the transmit power information in each transmission power report corresponds to a difference between a transmit power associated with uplink transmissions using the respective antenna group and the respective transmit power threshold for the respective antenna group.

Aspect 22: The method of any of aspects 17 through 21, wherein the transmit power information in each transmission power report corresponds to a maximum time period associated with transmission of the one or more uplink transmissions at a first transmit power.

Aspect 23: The method of any of aspects 15 through 22, further comprising: receiving, for each antenna group of the plurality of antenna groups indicated via the second message, a set of one or more transmit precoding matrix indicators associated with the antenna group, wherein the set of one or more transmit precoding matrix indicators maps the antenna group to a respective set of one or more antenna ports of the plurality of antenna ports at the UE.

Aspect 24: The method of aspect 23, further comprising: transmitting a control message that indicates a first transmit precoding matrix indicator associated with the first antenna group based at least in part on receiving the set of one or more transmit precoding matrix indicators for each antenna group, wherein receiving the one or more uplink transmissions from the first antenna group is based at least in part on the control message indicating the first transmit precoding matrix indicator.

Aspect 25: The method of any of aspects 15 through 24, further comprising: selecting, from a plurality of transmit precoding matrix indicators, a first transmit precoding matrix indicator associated with the first antenna group based at least in part on an indication of one or more metrics associated with a channel at a first antenna port of the UE that maps to the first antenna group and the respective transmit power threshold for the first antenna group; and transmitting, based at least in part on the selecting, a control message that indicates a first transmit precoding matrix indicator associated with the first antenna group, wherein receiving the one or more uplink transmissions from the first antenna group is based at least in part on the control message indicating the first transmit precoding matrix indicator.

Aspect 26: The method of any of aspects 15 through 25, wherein the respective transmit power threshold for each antenna group is based at least in part on a sum of a normalized specific absorption rate exposure and a normalized power density exposure for the antenna group.

Aspect 27: The method of any of aspects 15 through 26, wherein the plurality of antenna groups are associated with respective physical locations on the UE.

Aspect 28: An apparatus for wireless communications at a UE, comprising a processor; memory coupled with the processor; and instructions stored in the memory and executable by the processor to cause the apparatus to perform a method of any of aspects 1 through 14.

Aspect 29: An apparatus for wireless communications at a UE, comprising at least one means for performing a method of any of aspects 1 through 14.

Aspect 30: A non-transitory computer-readable medium storing code for wireless communications at a UE, the code comprising instructions executable by a processor to perform a method of any of aspects 1 through 14.

Aspect 31: An apparatus for wireless communications at a network entity, comprising a processor; memory coupled with the processor; and instructions stored in the memory and executable by the processor to cause the apparatus to perform a method of any of aspects 15 through 27.

Aspect 32: An apparatus for wireless communications at a network entity, comprising at least one means for performing a method of any of aspects 15 through 27.

Aspect 33: A non-transitory computer-readable medium storing code for wireless communications at a network entity, the code comprising instructions executable by a processor to perform a method of any of aspects 15 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions. Also, as used herein, the phrase "a set" shall be construed as including the possibility of a set with one member. That is, the phrase "a set" shall be construed in the same manner as "one or more."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   memory coupled with the one or more processors; and
   instructions stored in the memory and executable by the one or more processors to cause the apparatus to:
   transmit a first message that indicates a plurality of antenna ports available for the wireless communications at the UE;
   transmit a second message that indicates a plurality of antenna groups associated with the plurality of antenna ports, wherein the plurality of antenna groups comprise respective sets of one or more antenna elements and are associated with respective transmit power thresholds;
   receive, in accordance with the first message and the second message, a control message indicating a first antenna group of the plurality of antenna groups indicated via the second message; and
   transmit one or more uplink transmissions using the first antenna group indicated by the control message, wherein transmitting the one or more uplink transmissions using the first antenna group is in accordance with a transmit power threshold of the first antenna group.

2. The apparatus of claim 1, wherein the instructions are further executable by the one or more processors to cause the apparatus to:
   transmit one or more transmission power reports that each comprise transmit power information for a respective antenna group of the plurality of antenna groups.

3. The apparatus of claim 2, wherein the transmit power information in each transmission power report indicates a power headroom for the respective antenna group.

4. The apparatus of claim 2, wherein the transmit power information in each transmission power report indicates a power density threshold for the respective antenna group, the power density threshold associated with a specific absorption rate, a maximum permissible exposure, or both.

5. The apparatus of claim 2, wherein the instructions are further executable by the one or more processors to cause the apparatus to:
   transmit a first uplink transmission using the first antenna group based at least in part on the control message, wherein the control message further indicates a first transmit precoding matrix indicator associated with the first antenna group, and wherein the one or more transmission power reports include at least a first transmission power report comprising first transmit power information for the first antenna group based at least in part on the first uplink transmission using the first antenna group being a most recent uplink transmission by the UE.

6. The apparatus of claim 2, wherein the transmit power information in each transmission power report corresponds to a difference between a transmit power associated with uplink transmissions using the respective antenna group and the respective transmit power threshold for the respective antenna group.

7. The apparatus of claim 2, wherein the transmit power information in each transmission power report corresponds to a maximum time period associated with transmitting the one or more uplink transmissions at a first transmit power.

8. The apparatus of claim 1, wherein the instructions are further executable by the one or more processors to cause the apparatus to:

transmit, for each antenna group of the plurality of antenna groups indicated via the second message, a set of one or more transmit precoding matrix indicators associated with the antenna group, wherein the set of one or more transmit precoding matrix indicators maps the antenna group to a respective set of one or more antenna ports of the plurality of antenna ports at the UE.

9. The apparatus of claim 8, wherein the instructions to receive the control message are executable by the one or more processors to cause the apparatus to:

receive, via the control message, an indication of a first transmit precoding matrix indicator associated with the first antenna group based at least in part on transmitting the set of one or more transmit precoding matrix indicators for each antenna group, wherein the instructions are executable by the one or more processors to cause the apparatus to transmit the one or more uplink transmissions using the first antenna group based at least in part on the control message indicating the first transmit precoding matrix indicator.

10. The apparatus of claim 1, wherein the instructions are further executable by the one or more processors to cause the apparatus to:

transmit signaling that indicates one or more metrics associated with a channel at a first antenna port of the UE that maps to the first antenna group, wherein the control message indicates a first transmit precoding matrix indicator associated with the first antenna group based at least in part on the one or more metrics associated with the channel at the first antenna port and the respective transmit power threshold for the first antenna group, and wherein the instructions are executable by the one or more processors to cause the apparatus to transmit the one or more uplink transmissions using the first antenna group based at least in part on the control message indicating the first transmit precoding matrix indicator.

11. The apparatus of claim 10, wherein the first transmit precoding matrix indicator is associated with the first antenna group and one or more other antenna groups of the plurality of antenna groups, and the instructions are further executable by the one or more processors to cause the apparatus to:

select the first antenna group based at least in part on the first transmit precoding matrix indicator and a first power density threshold associated with the first antenna group being less than power density thresholds associated with each of the one or more other antenna groups.

12. The apparatus of claim 1, wherein the respective transmit power threshold for each antenna group is based at least in part on a sum of a normalized specific absorption rate exposure and a normalized power density exposure for the antenna group.

13. The apparatus of claim 1, wherein the plurality of antenna groups are associated with respective physical locations at the UE.

14. An apparatus for wireless communications at a network entity, comprising:

one or more processors;
memory coupled with the one or more processors; and
instructions stored in the memory and executable by the one or more processors to cause the apparatus to:

receive a first message that indicates a plurality of antenna ports at a user equipment (UE) that are available for the wireless communications;

receive a second message that indicates a plurality of antenna groups associated with the plurality of antenna ports, wherein the plurality of antenna groups comprise respective sets of one or more antenna elements and are associated with respective transmit power thresholds;

transmit, in accordance with the first message and the second message, a control message indicating a first antenna group of the plurality of antenna groups indicated via the second message; and receive one or more uplink transmissions from the first antenna group indicated by the control message, the one or more uplink transmissions from the first antenna group based at least in part on a transmit power threshold of the first antenna group.

15. The apparatus of claim 14, wherein the instructions are further executable by the one or more processors to cause the apparatus to:

select, based at least in part on the first message and the second message, the first antenna group of the plurality of antenna groups for the UE to use for the one or more uplink transmissions, wherein the instructions are executable by the one or more processors to cause the apparatus to transmit the control message that indicates the first antenna group based at least in part on selection of the first antenna group, and wherein the instructions are executable by the one or more processors to cause the apparatus to receive the one or more uplink transmissions from the first antenna group based at least in part on the control message indicating the first antenna group.

16. The apparatus of claim 14, wherein the instructions are further executable by the one or more processors to cause the apparatus to:

receive one or more transmission power reports each comprising transmit power information for a respective antenna group of the plurality of antenna groups.

17. The apparatus of claim 16, wherein the transmit power information in each transmission power report indicates a power headroom for the respective antenna group.

18. The apparatus of claim 16, wherein the transmit power information in each transmission power report indicates a power density threshold for the respective antenna group, the power density threshold associated with a specific absorption rate, a maximum permissible exposure, or both.

19. The apparatus of claim 16, wherein the instructions are further executable by the one or more processors to cause the apparatus to:

receive a first uplink transmission from the first antenna group based at least in part on the control message, wherein the control message further indicates a first transmit precoding matrix indicator associated with the first antenna group, and wherein the one or more transmission power reports include at least a first transmission power report comprising first transmit power information for the first antenna group based at least in part on the first uplink transmission using the first antenna group being a most recent uplink transmission by the UE.

20. The apparatus of claim 16, wherein the transmit power information in each transmission power report corresponds to a difference between a transmit power associated with uplink transmissions using the respective antenna group and the respective transmit power threshold for the respective antenna group.

21. The apparatus of claim 16, wherein the transmit power information in each transmission power report corresponds to a maximum time period associated with transmission of the one or more uplink transmissions at a first transmit power.

22. The apparatus of claim 14, wherein the instructions are further executable by the one or more processors to cause the apparatus to:
receive, for each antenna group of the plurality of antenna groups indicated via the second message, a set of one or more transmit precoding matrix indicators associated with the antenna group, wherein the set of one or more transmit precoding matrix indicators maps the antenna group to a respective set of one or more antenna ports of the plurality of antenna ports at the UE.

23. The apparatus of claim 22, wherein the instructions to transmit the control message are executable by the one or more processors to cause the apparatus to:
transmit, via the control message, an indication of a first transmit precoding matrix indicator associated with the first antenna group based at least in part on receiving the set of one or more transmit precoding matrix indicators for each antenna group, wherein the instructions are executable by the one or more processors to cause the apparatus to receive the one or more uplink transmissions from the first antenna group based at least in part on the control message indicating the first transmit precoding matrix indicator.

24. The apparatus of claim 14, wherein the instructions are further executable by the one or more processors to cause the apparatus to:
select, from a plurality of transmit precoding matrix indicators, a first transmit precoding matrix indicator associated with the first antenna group based at least in part on an indication of one or more metrics associated with a channel at a first antenna port of the UE that maps to the first antenna group and the respective transmit power threshold for the first antenna group, wherein the instructions are executable by the one or more processors to cause the apparatus to transmit the control message that further indicates a first transmit precoding matrix indicator associated with the first antenna group based at least in part on selection of the first transmit precoding matrix indicator, and wherein the instructions are executable by the one or more processors to cause the apparatus to receive the one or more uplink transmissions from the first antenna group based at least in part on the control message indicating the first transmit precoding matrix indicator.

25. The apparatus of claim 14, wherein the respective transmit power threshold for each antenna group is based at least in part on a sum of a normalized specific absorption rate exposure and a normalized power density exposure for the antenna group.

26. The apparatus of claim 14, wherein the plurality of antenna groups are associated with respective physical locations on the UE.

27. A method for wireless communications at a user equipment (UE), comprising:
transmitting a first message that indicates a plurality of antenna ports available for the wireless communications at the UE;
transmitting a second message that indicates a plurality of antenna groups associated with the plurality of antenna ports, wherein the plurality of antenna groups comprise respective sets of one or more antenna elements and are associated with respective transmit power thresholds;
receiving, in accordance with the first message and the second message, a control message indicating a first antenna group of the plurality of antenna groups indicated via the second message; and
transmitting one or more uplink transmissions using the first antenna group indicated by the control message, wherein transmitting the one or more uplink transmissions using the first antenna group is based at least in part on a transmit power threshold of the first antenna group.

28. A method for wireless communications at a network entity, comprising:
receiving a first message that indicates a plurality of antenna ports at a user equipment (UE) that are available for the wireless communications;
receiving a second message that indicates a plurality of antenna groups associated with the plurality of antenna ports, wherein the plurality of antenna groups comprise respective sets of one or more antenna elements and are associated with respective transmit power thresholds;
transmit, in accordance with the first message and the second message, a control message indicating a first antenna group of the plurality of antenna groups indicated via the second message; and
receiving one or more uplink transmissions from the first antenna group indicated by the control message, the one or more uplink transmissions from the first antenna group based at least in part on a transmit power threshold of the first antenna group.

\* \* \* \* \*